(12) United States Patent
Hershberger

(10) Patent No.: US 6,711,214 B1
(45) Date of Patent: Mar. 23, 2004

(54) REDUCED BANDWIDTH TRANSMITTER METHOD AND APPARATUS

(75) Inventor: David L. Hershberger, Nevada City, CA (US)

(73) Assignee: ADC Broadband Wireless Group, Inc., Eden Prairie, MN (US)

( * ) Notice: Subject to any disclaimer, the term of this patent is extended or adjusted under 35 U.S.C. 154(b) by 0 days.

(21) Appl. No.: 09/544,206

(22) Filed: Apr. 7, 2000

(51) Int. Cl.[7] .................. H04L 27/10; H04L 25/49; H04L 1/00
(52) U.S. Cl. .................. 375/285; 375/296; 375/346
(58) Field of Search .................. 375/285, 295, 375/296, 316, 346, 350, 301, 277, 321, 123, 170; 332/123, 170; 348/723, 724, 725

(56) References Cited

U.S. PATENT DOCUMENTS 6,236,353 B1 * 5/2001 Cermignani et al. ........ 342/201

FOREIGN PATENT DOCUMENTS

WO      WO 00/45503      *   8/2000

* cited by examiner

Primary Examiner—Tesfaldet Bocure
(74) Attorney, Agent, or Firm—Fogg & Associates, LLC; Laura A. Ryan

(57) ABSTRACT

A reduced bandwidth 8VSB, ATSC transmitter transmits to conventional DTV receivers having bandpass filters with root raised cosine (RRC) band edge responses. The transmitter includes a vestigial sideband modulator for transferring energy in a portion of a spectrum on a first side of a predetermined frequency to a second side of the predetermined frequency. At the low band edge of the spectrum, the predetermined frequency is the pilot carrier frequency. At the high end of the spectrum, the predetermined frequency is the Nyquist sampling frequency. The energy transfer is such that no energy is transmitted between at least one band edge of the spectrum and an intermediate frequency between the band edge and the predetermined frequency. The energy is transferred on a frequency to frequency basis as a function of the energy in the RRC transition and the amplitude of a weighting function extending between the intermediate frequency and the predetermined frequency.

62 Claims, 12 Drawing Sheets

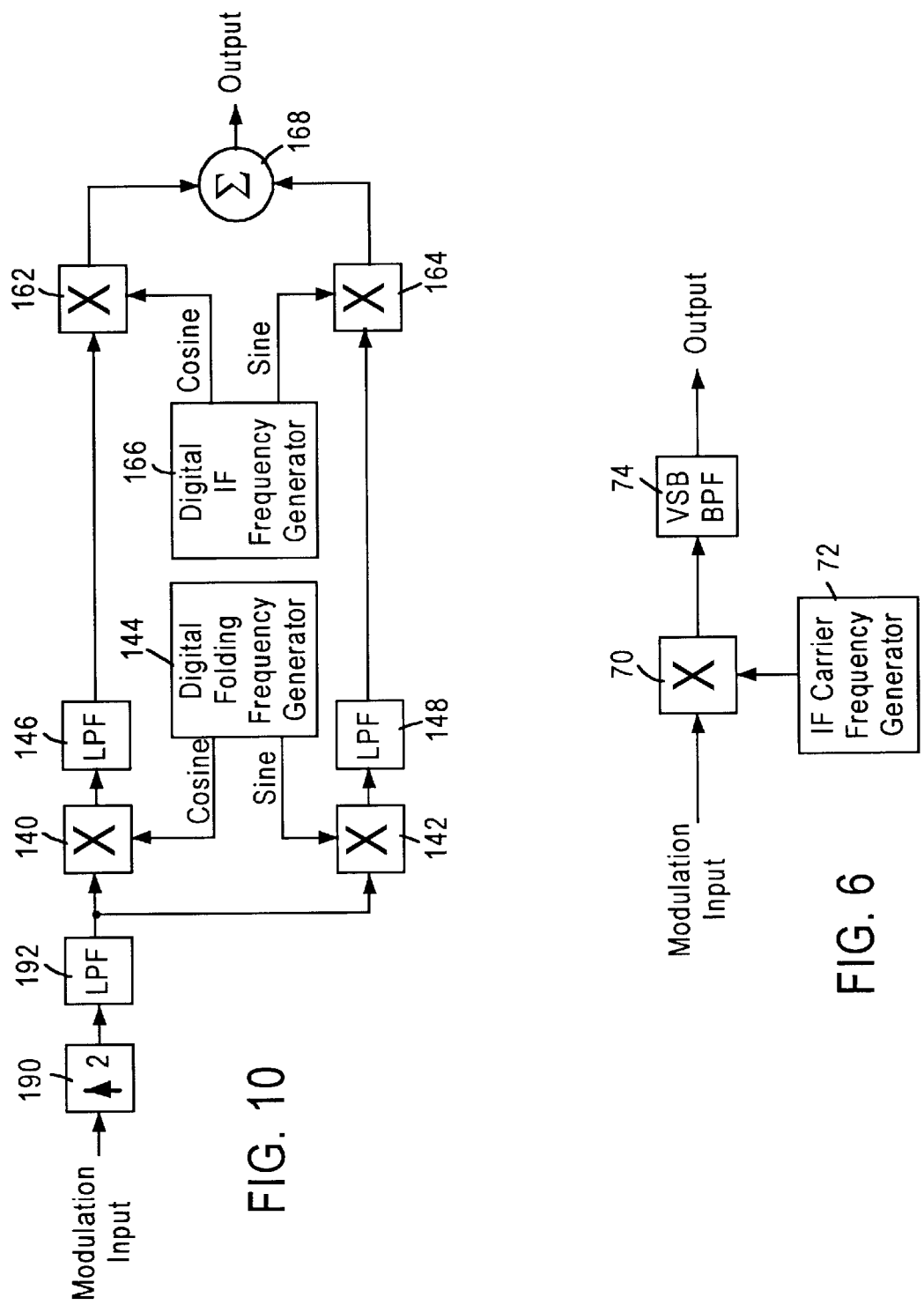

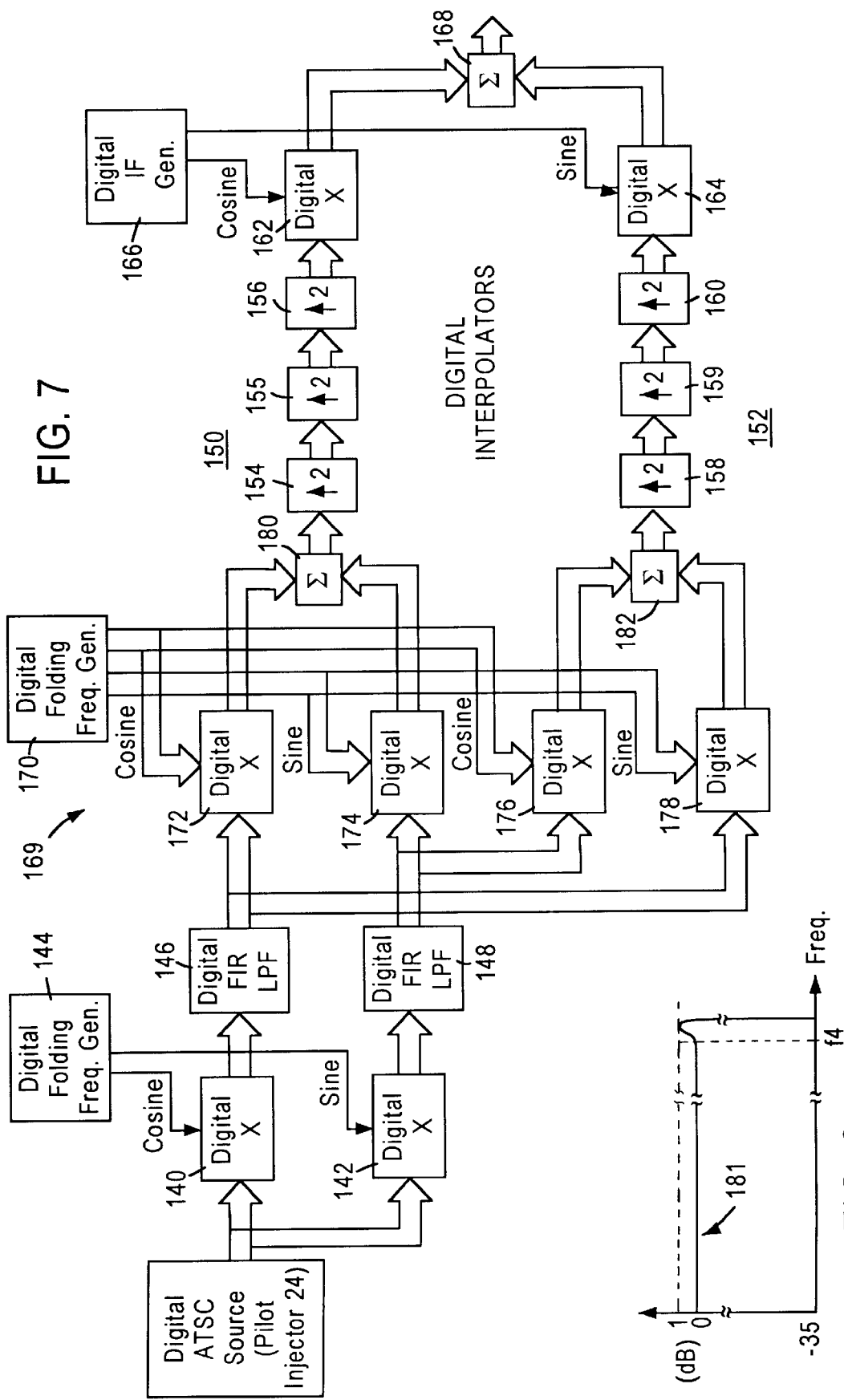

REDUCED BANDWIDTH TRANSMITTER METHOD AND APPARATUS

FIELD OF THE INVENTION

The present invention relates generally to transmitter methods and apparatus and, more particularly, to a transmitter method and apparatus wherein energy in a portion of a spectrum on a first side of a predetermined frequency is transferred to a second side of the predetermined frequency in such a manner that at least some of the transferred energy results in a reduction of transmitted bandwidth and receivers responsive to the transmitter respond to the transferred energy as if it were on the first side of the predetermined frequency.

BACKGROUND ART

The problem of frequency spectrum crowding has become so severe that government allocated spectra for different types of transmission results, in some cases, in overlapping spectra for different transmitters. For example, the United States Federal Communications Commission (FCC) in establishing a table of channel allocations for the Advanced Television Standards Committee (ATSC), eight level vestigial sideband (8VSB) digital television (DTV) transmitters has created severe technical problems for television channel 14 (470–476 MHz). There are terrestrial mobile radio transmitters which the FCC has licensed at 469.975 MHz, i.e., at a frequency allocation very close to the lower band edge of channel 14. It is extremely difficult to protect the low power 469.975 MHz radio emission from the high power DTV signal having energy at 470 MHz, only 0.025 MHz away from the 469.975 MHz emission. This is particularly the case since the FCC has required the 470 MHz band edge to be down only 36 dB from the mid-band amplitude. If prior techniques were used, the channel 14 allocation would be useless in most cases because it would overpower the 469.975 MHz emission, a situation the FCC will not permit.

Another situation that is problematic is the so-called "N+1" allocation. In the "N+1" allocation, a National Television Systems Committee (NTSC) licensee is assigned a DTV channel that is the next channel up from the licensee's NTSC channel. In this situation, the NTSC aural carrier has significant sidebands that extend to within about 75 kHz of the NTSC channel edge, and therefore to within about 75 kHz of the DTV signal. This creates problems for stations that wish to use frequency selective combiners with separate NTSC and DTV transmitters. Yet another problem is the radio telescope allocation at channel 37 in the UHF DTV band (608–614 MHz). DTV stations on channel 36 or 38 may interfere with radio telescope operations on channel 37.

A typical prior art digital television transmitter adapted to transmit signals containing information indicative of digitally encoded video and aural signals for deriving an ATSC A/53 standard signal is illustrated in FIG. 1 as including multi-bit digital baseband television signal source 10 which drives the cascaded combination of data randomizer 11, Reed-Solomon encoder 12, data interleaver 14, trellis encoder 16 and multiplexer 18. In the 8VSB system, the signals derived from source 10, randomizer 11, encoders 12 and 16, as well as interleaver 14 and multiplexer 18 include three parallel bits having a symbol rate (i.e., sampling frequency) of $$\frac{1.539 \times 10^9}{143},$$

i.e., the encoded television signal that source 10 derives is sampled 10,762,237.76 times per second. Because each symbol includes two or three bits, the bit rate is substantially higher than the symbol rate. The three parallel bits represent 8 amplitude levels of the encoded television signal.

Multiplexer 18, in addition to being responsive to the output of trellis encoder 18, responds to segment synchronizing source 20 and field synchronizing source 22 to derive an output having the same number of bits as applied to the multiplexer by encoder 16. Multiplexer 14 supplies a multi-bit output signal to pilot inserter 24 which inserts a constant bit pattern representing a DC amplitude equal to 0.625 of the weight of a single bit in the incoming 3 bit pattern. Pilot inserter 24 derives a multi-bit output signal which drives pre-equalizer filter 26.

Pilot inserter 24 derives a multi-bit output signal which drives pre-equalizer filter 26. Pre-equalizer filter 26 supplies a multi-bit intermediate frequency (IF) signal to vestigial sideband modulator or generator 28. Generator 28 feeds a multi-bit digital IF signal to digital to analog converter 30, which supplies an analog IF signal to frequency up converter 32. Converter 32 is a frequency synthesizer that heterodynes the IF output frequency of converter 30 to a radio frequency (RF) carrier frequency. Up converter 32 also inverts the IF spectrum digital to analog converter 30 derives so up converter 32 converts (1) the lowest frequencies in the IF spectrum into the highest frequencies in the RF spectrum and (2) the highest frequencies in the IF spectrum to the lowest frequencies in the RF spectrum. RF up converter 32 applies the modulated carrier frequency signal to antenna 34 via power amplifier 36.

The output signal of digital to analog converter 30 includes orthogonal I and Q channels or components. At predetermined time intervals, after the receiver's root raised cosine filtering, the I channel has one of multiple levels, corresponding to the number of amplitude levels in the 3 bit signal source 10 derives. The Q channel contains no independent information, but causes part of the unwanted lower sideband appearing at the output of up converter 32 to be reduced substantially to zero amplitude. The unwanted lower sideband is removed by circuitry included in vestigial sideband generator 28 and up converter 32 does not reintroduce it. Because up converter 32 "flips" (i.e., inverts) the IF spectrum that digital to analog converter 30 derives, the upper sideband RF output of converter 30 is reduced substantially to zero.

To enable digital to analog converter 30 to produce the desired vestigial sideband signal, vestigial sideband modulator or generator 28 derives the baseband vestigial sideband spectrum illustrated in FIG. 2. The spectrum of FIG. 2 has a 6 MHz bandwidth and includes the 309.44056 kHz pilot carrier frequency that pilot inserter 24 derives, as well as a vestigial sideband that extends 309.4405594 kHz below the pilot carrier frequency, to the left of the carrier as illustrated in FIG. 2. The response curve of FIG. 2 has a flat portion 38 that extends throughout the vast majority of the transmitter 6.0 MHz bandwidth. The response curve has monotonic root raised cosine (RRC) transitions 40 and 42 at its upper and lower band edges. Transitions 40 and 42 are symmetrical, each having a frequency extent of about 619 kHz (i.e., twice the pilot carrier frequency) between the edges of the transmitter bandwidth and the corner frequencies where the transitions end and flat portion 38 begins. Receivers responsive to transmitters of the type illustrated in FIG. 1 include a filter with the same response as FIG. 2.

The amplitude response of each of transitions 40 and 42 at any frequency (f) from the mid-point frequency ($f_t$) of each transition is:

$$Rrc(f) = sqrt\left(\frac{1}{2}\left[1 + \cos\pi\left(\frac{f - f_t}{2f_t}\right)\right]\right) \quad (1)$$

Vestigial sideband modulator 28 for deriving the ATSC A/53 standard has generally used a Hilbert filter or phasing method. My co-pending commonly assigned application, Ser. No. 09/239,668, filed Jan. 29, 1999, entitled "Vestigial Sideband Generator Particularly for Digital Television," discloses a modified Weaver modulator as the device for generating the vestigial sideband spectrum that modulator 28 derives.

The ATSC standard 8VSB transmission system, like many other digital transmission systems, includes a certain amount of "excess bandwidth." Because the 8VSB transmitter transmits symbols at a rate of 10.76223776 . . . million per second, the transmitter requires a minimum theoretical bandwidth of 5.381118881 . . . MHz (half the symbol rate). Although this is a theoretical minimum, it is physically impossible to build a transmitter that only uses the minimum bandwidth. As a practical matter, it is necessary to have a certain amount of additional ("excess") bandwidth for filter transition bands. Consequently, the 8VSB system has about 11.5% excess bandwidth. In other words, the 6 MHz channel width divided by 5.381118881 . . . MHz is approximately 11.5% greater than unity. To achieve an overall flat amplitude response between a DTV transmitter and a DTV receiver, the ATSC standard requires the shape of filtering in transition bands of the edges of the spectrum to have the root raised cosine (RRC) response of Equation (1). Because the RRC filter response is applied twice, at the transmitter and at the receiver, the 8VSB signal magnitude response is squared, providing an overall raised cosine shape. When the receiver demodulates the signal it receives from the transmitter, the I channel of the 8VSB signal has a flat amplitude response.

In the Hilbert filter method, vestigial sideband modulator 28 generates a double sideband signal that is filtered to produce a vestigial sideband signal at an IF of about 10 MHz. Sidebands extend equally around the 10 MHz IF in accordance with:

$$0.5F_{sym} + F_{pilot} = 6\text{MHz} - F_{pilot} \quad (2)$$

where $F_{sym}$ is the 10.76223776 . . . MHz symbol clock frequency of the bits source 10 derives in accordance with the ATSC A/53 standard, and $$F_{pilot} = \frac{59}{3} \cdot FH_{NTSC} = \frac{59}{3} \cdot \frac{4.5 \text{ MHz}}{286}$$

where $FH_{NTSC}$ is the NTSC horizontal line frequency.

Based on the foregoing, a vestigial sideband modulator 28 including a Hilbert transform has a double sideband modulator with sidebands that extend ±5.690559441 . . . MHz on either side of the about 10 MHz carrier. A convenient sampling frequency is four times the 10.76223776 . . . MHz symbol clock rate, i.e., 43.04895105 . . . MHz.

The Hilbert transform modulator uses a phasing method that partially cancels the unwanted sideband of the double sideband signal with the RRC transition. Obtaining a proper root-raised cosine response for vestigial sideband shaping at the 43.04895105 . . . MHz sampling rate of the Hilbert transform requires a finite impulse response (FIR) filter having about 2048 filter coefficients. Implementation of such a filter is difficult.

The Hilbert transform can easily generate a vestigial sideband signal such that DC is 6 dB down with respect to the sidebands. This is because the response of any Hilbert transform approximation is always zero at DC. With only one of the I and Q modulators included in such a vestigial Hilbert transform sideband generator contributing at DC, the vector sum of the outputs of the two modulators drops in half at DC relative to the vector sum at a frequency where both the I and Q channels contribute to the generator output. However, in the ATSC A/53 standard, the requirement for the root-raised cosine response places the DC output at −3 dB instead of −6 dB. Therefore, the Hilbert transform method of vestigial sideband digital television modulation requires a low frequency equalizer to produce a +3 dB "shelf" at DC and the low frequency portions of the baseband spectrum.

To achieve the ATSC A/53 standard, the Hilbert transform vestigial sideband generator has a linear phase requirement. Consequently, equalizer filter 26 is generally implemented as a finite impulse response filter having a large number of coefficients. Further, a −3 dB requirement exists at the Nyquist frequency of the symbols, i.e., half the symbol frequency, with certain modifications. Hence, equalizer 26 must include a high frequency portion operating at a sampling frequency higher than twice the symbol rate to avoid aliasing, i.e., insertion of information at frequencies that do not exist in the sample frequency due to sampling at a frequency less than twice the highest frequency component being filtered. In this case, the highest frequency being filtered is 5.690559441 . . . MHz, which is more than half the symbol rate. This is another reason why the Hilbert transform method of producing a vestigial sideband signal with root-raised cosine sideband shaping is also quite difficult to implement.

Because power amplifier 34 has a non-linear amplitude response, nonlinear equalizer 26 must apply a substantial non-linear correction to the signal applied to it. Because of the possibility of aliasing and spectral folding through zero frequency, the amount of nonlinear correction which can be applied at 10 MHz is limited, resulting in distortion in the transmitted signal.

My co-pending application is based on my realization that the non-linear correction can be more effectively provided by using the modified Weaver modulator in a way that substantially reduces distortion in the transmitted signal by employing an IF digital signal having a frequency approximately twice the approximately 10 MHz frequency of the prior art digital IF. The arrangement I previously invented and disclosed in my co-pending application enables the digital IF signal to have a frequency of approximately or exactly 21.5 MHz.

The modified Weaver vestigial sideband modulator includes an oscillator with a folding frequency and lowpass filters with cut off frequencies such that "negative" frequencies the modulating baseband signal pilot inserter 24 derives appear in a signal derived from an adder as a vestige of the opposite sideband, i.e., the positive frequencies of the modulating baseband signal. The folding frequency and the cutoff frequency of the lowpass filters are selected such that a desired amount of the opposite sideband is eliminated but a certain portion of it is passed. Preferably, vestigial sideband modulation is produced by using a Weaver modulator having a reduced folding frequency and lowpass filters having increased cutoff frequencies.

It is, accordingly, an object of the present invention to provide a new and improved method of and apparatus for reducing the bandwidth of a transmitted signal without affecting a conventional receiver responsive to the transmitted signal.

Another object of the invention is to provide a new and improved method of and apparatus for generating a vestigial sideband signal, particularly a digital vestigial sideband IF signal.

An additional object of the invention is to provide a new and improved digital television transmitter apparatus and method wherein a tendency for the transmitted signal in some channels to interfere with signals having a neighboring spectrum is overcome.

A further object of the invention is to provide a new and improved digital television transmitter apparatus and method wherein a tendency for the transmitted signal in some channels to interfere with signals derived by neighboring low power transmitters is avoided.

An added object of the invention is to provide a new and improved 8VSB transmitter employing digital filtering techniques for modifying the 8VSB spectrum in such a manner as to avoid interference with neighboring transmitters, wherein the 8VSB transmitter includes passive analog channel output filters and combiners and standard DTV receivers respond to the modified 8VSB spectrum to provide a television signal that is not degraded.

SUMMARY OF THE INVENTION

According to one aspect of the invention, a method of preventing substantial interference between portions of first and second spectra that tend to overlap is provided. The overlapping portion of the first spectrum is in a band of frequencies on a first side of a predetermined frequency of the first spectrum. The predetermined frequency is outside the second spectrum and within the first spectrum. The method includes the steps of modifying the first spectrum prior to transmission thereof by transferring energy in frequencies on the first side of the predetermined frequency of the first spectrum to frequencies on the second side of the predetermined frequency so that all energy between a first frequency at a band edge of the first spectrum and a second frequency between the first frequency and the predetermined frequency is reduced substantially to zero. The frequencies on the second side are within the first spectrum. The transfer is such that a receiver designed to respond to the first spectrum causes the transferred energy to be shifted from the second side of the predetermined frequency to the first side of the predetermined frequency. The amount of energy transferred is such that there is no substantial interference between the transmitted first and second spectra.

The receiver includes a bandpass filter with a transition having a predetermined amplitude versus frequency response between a frequency at one band edge of the bandpass filter and a mid-range portion of the bandpass filter response. The predetermined frequency is displaced toward the frequency at said one band edge and from a corner frequency between the mid-range portion and the transition. The energy transfer is preferably such that (1) all energy between the first and second frequencies is transferred on a frequency to frequency basis to frequencies that are on the second side of the predetermined frequency and are equally displaced from the predetermined frequency, and (2) some energy between the second frequency and the predetermined frequency is transferred, on a frequency to frequency basis, to frequencies that are on the second side of the predetermined frequency and are equally displaced from the predetermined frequency. The amount of the energy transferred from between the second frequency and the predetermined frequency is determined by the relative amplitudes of (a) an amplitude versus frequency weighting function that extends over a band of frequencies between the second frequency and the predetermined frequency and (b) the amplitude versus frequency response of the receiver transition.

The invention is particularly useful for situations wherein the first spectrum is a DTV vestigial sideband spectrum and the receiver bandpass filter has a flat mid-range amplitude versus frequency response and a root raised cosine transition between the corner frequency and the first frequency. In such a case, the predetermined frequency at the low frequency band edge is a baseband pilot carrier frequency and at the high frequency band edge is a Nyquist sampling frequency.

In one embodiment, the modified spectrum has a symmetrical amplitude versus frequency response with respect to its center frequency. In another embodiment, the modified spectrum has an amplitude versus frequency response at its high frequency band edge including the transferred energy and an amplitude versus frequency response at its low frequency band edge that is substantially the same as the receiver transition. In a further embodiment, the modified spectrum has an amplitude versus frequency response at its low frequency band edge including the transferred energy and an amplitude versus frequency response at its high frequency band edge that is substantially the same as the receiver transition.

Preferably, the energy transfer includes lowpass filtering a signal resulting from a baseband signal containing information to be transmitted. The lowpass filtering includes multiplying the signal resulting from the baseband signal by (a) a constant amplitude from DC to another frequency where the transition begins, (b) amplitudes greater than the constant amplitude for frequencies between the another frequency and a further frequency, (c) finite amplitudes less than the constant amplitude for frequencies greater than the further frequency and (d) zero for frequencies that are displaced from the another frequency by the same amount that said frequency at the band edge of the bandpass filter is displaced from the corner frequency.

In one embodiment, the energy transfer includes multiplying a baseband signal containing information to be transmitted by sine and cosine representations to derive a pair of product signals. The sine and cosine representations are at a folding frequency. Replicas of the product signals are lowpass filtered as described supra. The signals resulting from the lowpass filtering are combined to derive the reduced bandwidth spectrum.

In one embodiment, the replicas on which the lowpass filtering steps are performed result directly from the multiplying operations to cause the spectrum resulting from the combining step to be symmetrical with respect to a frequency at the center of the first spectrum.

According to another embodiment, second lowpass filtering steps are performed on replicas of the product signals. The second lowpass filtering steps are performed on the product signal replicas before the first mentioned lowpass filtering operation is performed. The second lowpass filtering operations include multiplying the replicas of the product signal by (a) a constant amplitude from DC to the another frequency, and (b) the receiver transition amplitude versus frequency response for frequencies between the another frequency and a frequency removed from the another frequency by an amount equal to the displacement of the band edge of the receiver bandpass filter from the corner frequency. The spectra resulting from the second lowpass filtering steps are shifted to cause the spectrum resulting from the combining step to be asymmetrical with respect to a frequency at the center of the first spectrum. The asymmetrical spectrum has the same amplitude versus frequency response at a first band edge as the receiver bandpass filter and has an amplitude versus frequency response at a second band edge determined by the first mentioned lowpass filtering operation.

In another embodiment, the signal resulting from the first mentioned lowpass filtering step is multiplied by sine and cosine representations to derive a pair of product signals. The sine and cosine representations are at a folding frequency. Second lowpass filtering operations are performed on replicas of the product signals. The second lowpass filtering operations are performed on the product signal replicas before the first mentioned lowpass filtering operation is performed. The second lowpass filtering operations multiply the replicas of the product signal by (a) a constant amplitude from DC to the another frequency, and (b) the receiver transition amplitude versus frequency response for frequencies between the another frequency and a frequency removed from the another frequency by an amount equal to the displacement of the band edge of the receiver bandpass filter from the corner frequency.

The signals resulting from the second lowpass filtering step are preferably multiplied, according to one embodiment, by cosine and sine representations of an IF to derive second product signals. The second product signals are combined to derive an asymmetrical spectrum that has the amplitude versus frequency response of the receiver transitions at its low frequency edge and the amplitude versus frequency response resulting from the first mentioned lowpass filter operation at its high frequency edge.

According to a further embodiment, I and Q channel Hilbert transform operations are performed on a signal resulting from the baseband signal so that signals resulting from the I and Q channel transform operations have the first mentioned lowpass filtering operations applied to them. Replicas of the signals resulting from the I and Q channel Hilbert transform operations are combined to derive the first spectrum. The combining step preferably includes multiplying the signals resulting from the I and Q channel Hilbert transform operations with representations of cosine and sine waves at an IF to form product signals that are added.

A further aspect of the invention relates to a transmitter for a first spectrum having a portion that tends to overlap in an interfering manner with a neighboring spectrum. The overlapping portion is in a band of frequencies on a first side of a predetermined frequency that is outside the second spectrum and within the first spectrum. The transmitter includes a filter for modifying the first spectrum prior to transmission. The filter is arranged for transferring energy in frequencies on the first side of the predetermined frequency of the first spectrum to frequencies on a second side of the predetermined frequency. The energy transfer causes substantial elimination from the first spectrum of all energy between a band edge of the first spectrum and another frequency between the band edge and the predetermined frequency. The frequencies on the second side are within the first spectrum. The transfer is such that receivers designed to respond to the first spectrum cause the transferred energy to be shifted from the second side of the predetermined frequency to the first side of the predetermined frequency. An output device is connected to be responsive to the modified spectrum.

The filter preferably includes a digital vestigial sideband modulator connected to be responsive to a digital baseband television signal source and a carrier pilot inserted on the digital baseband television signal source.

In one embodiment, the digital vestigial sideband modulator includes a digital filter including a Hilbert transform combined with a lowpass filter having an amplitude versus frequency response for causing the energy transfer.

In a second embodiment, the vestigial sideband modulator includes a digital folding frequency source for deriving orthogonal components at the predetermined frequency. A digital multiplier arrangement responds to the orthogonal components and the digital signal source for deriving a pair of orthogonal product digital signal components. A digital lowpass filter arrangement responds to the pair of orthogonal product digital signal components. The orthogonal digital signal components passed by the digital lowpass filter arrangement are combined. The digital lowpass filter arrangement has a response and the digital signal components passed by the digital lowpass filter are combined so the energy transfer occurs and there is no substantial energy between the another frequency and the band edge of the first spectrum.

A further aspect of the invention relates to a memory for controlling an electromagnetic wave transmitter that is arranged for transmitting a signal to a receiver having a predetermined response. The memory stores signals for preventing substantial interference between portions of first and second spectra that tend to overlap. The overlapping portion of the first spectrum is in a band of frequencies on a first side of a predetermined frequency of the first spectrum. The predetermined frequency is outside the second spectrum and within the first spectrum. The stored signals cause a modification of the first spectrum prior to transmission thereof by transferring energy in frequencies on the first side of the predetermined frequency of the first spectrum to frequencies on a second side of the predetermined frequency so that all energy between a first frequency at the band edge and a second frequency between the first frequency and the predetermined frequency is reduced substantially to zero. The frequencies on the second side are within the first spectrum. The transfer is such that a receiver designed to respond to the first spectrum causes the transferred energy to be shifted from the second side of the predetermined frequency to the first side of the predetermined frequency.

The above and still further objects, features and advantages of the present invention will become apparent upon consideration of the following detailed descriptions of several specific embodiments thereof, especially when taken in conjunction with the accompanying drawings.

BRIEF DESCRIPTION OF THE DRAWINGS

As described.

FIG. 6 is a block diagram of a vestigial modulator 28, FIG. 1, including a basic bandpass filter that can theoretically be used to obtain the reduced bandwidth responses of FIGS. 3 and 4;

FIG. 7 is a block diagram of a modified Weaver modulator that can actually be employed as vestigial modulator 28, FIG. 1, and which produces the reduced bandwidth responses of FIGS. 3 and 4;

FIG. 8 includes an amplitude versus frequency response curve of low-pass filters included in FIG. 6;

FIG. 10 is a block diagram of a modified Weaver modulator that can be employed as vestigial modulator 28 and which is based on the high frequency transition curve of FIG. 4, but which does not provide reduced bandwidth on the low frequency transitional part of the response of FIG. 2;

DETAILED DESCRIPTION OF DRAWINGS

Figure 3:
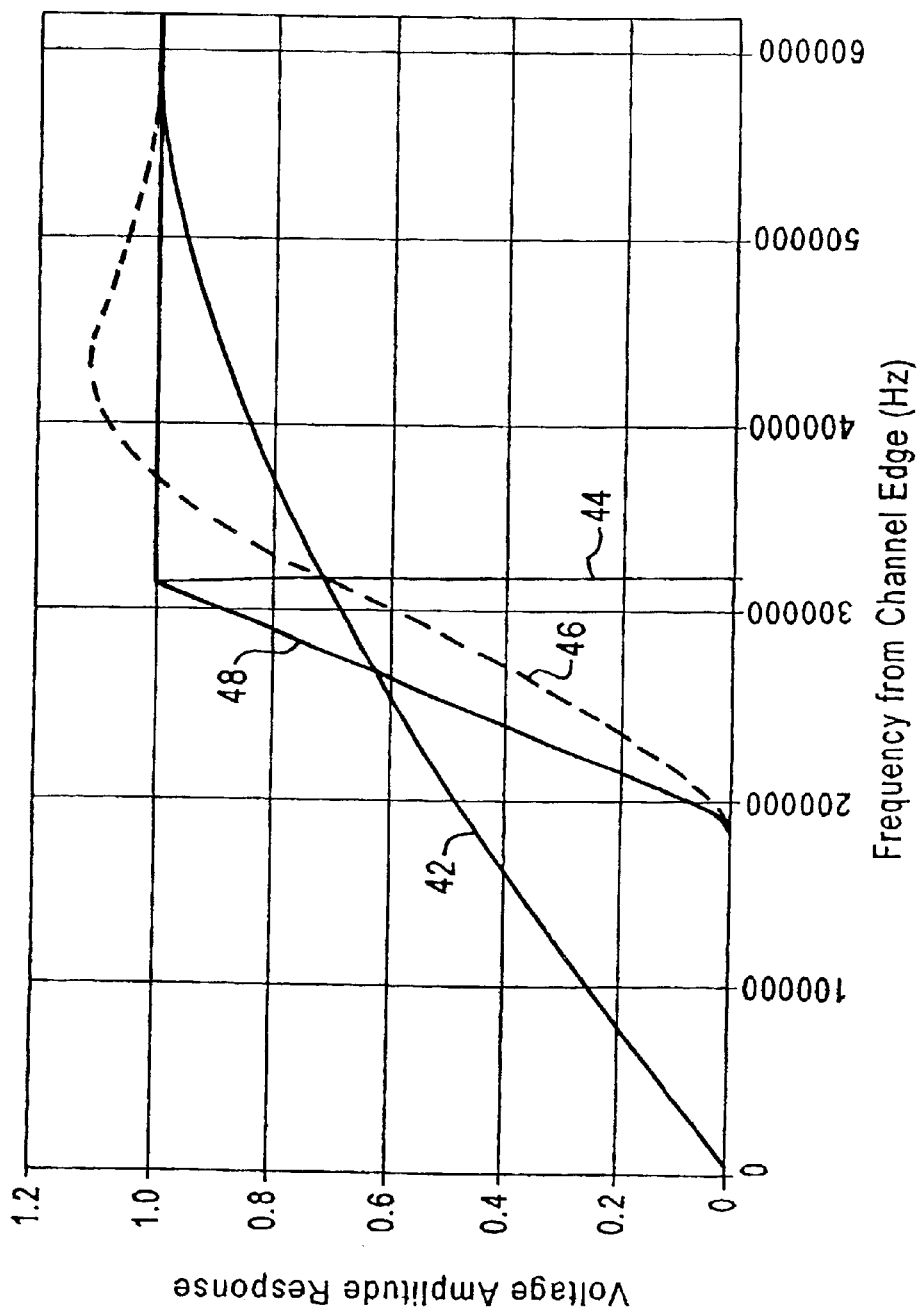
FIGS. 3 and 4 respectively include response curves at the lower and upper edges of (1) the root raised cosine response of receivers responsive to a transmitter of the present invention, (2) weighting functions to achieve a reduced bandwidth spectrum, and (3) reduced bandwidth responses resulting from the weighting function.
Figure 4:
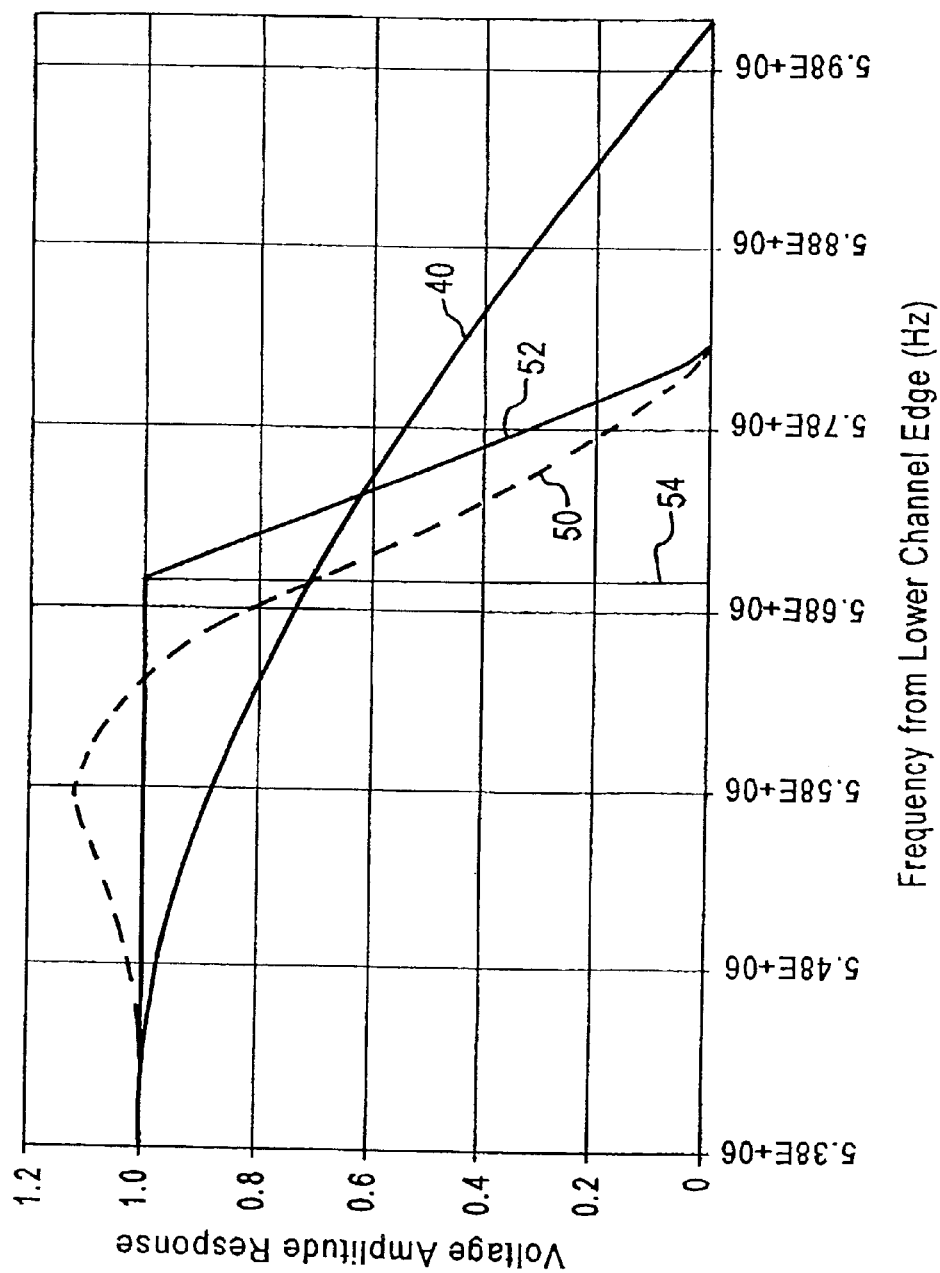

Before discussing the various embodiments illustrated in the drawings, the voltage amplitude versus frequency response curves of FIGS. 3 and 4, respectively at the low and high frequency edges of an 8VSB, ATSC, DTV baseband spectrum, are described to explain the operation of vestigial sideband modulator 28 using principles of a preferred embodiment of the method of the invention.

Figure 2:
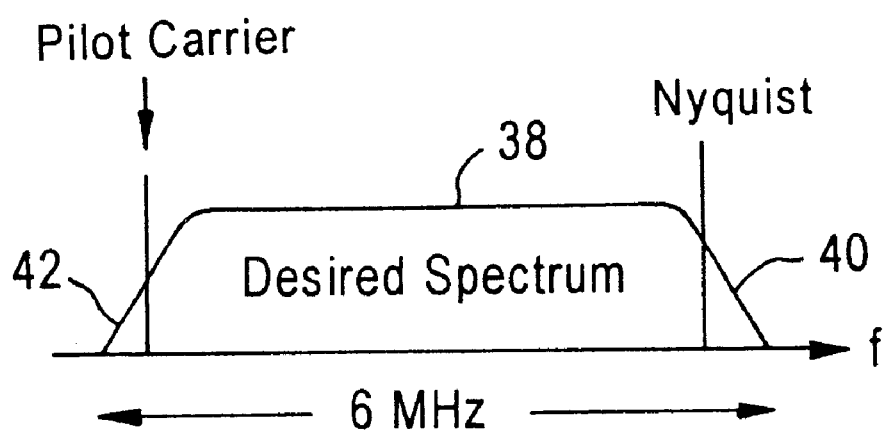

In FIG. 3, standard RRC transition 42 has (1) a zero amplitude response value at the baseband low frequency edge, where frequency from channel edge is 0 Hz, (2) a monotonically increasing value indicated by Equation (1), and (3) a final amplitude response value of 1.0 at the end of the transition, where frequency from channel edge is 618.8811988 kHz, i.e., twice the pilot frequency of 309.4405994 kHz (indicated by line 44) from the channel edge. In accordance with one aspect of the present invention, the bandwidth of transition 42 is reduced by establishing a guard band between the channel edge and a predetermined frequency removed from the channel edge. All the energy that is within transition 42 and is in the guard band is reduced to zero and transferred to another part of the baseband spectrum, between the pilot frequency and the corner frequency at the end of the transition and the beginning of the flat mid-range portion 38 of FIG. 2. The energy transfer is performed in such a way as to be recovered by 8VSB, ATSC, DTV receivers as if all of that energy had been in the guard band.

In FIG. 3 the guard band extends from the channel edge to 184,440.5 Hz from the channel edge (i.e., 125 kHz from the 309,440.6 Hz pilot). Hence, all energy in the spectrum that drives modulator 28 between zero and 184,440.5 Hz is transferred, on a frequency to frequency basis, to frequencies above the pilot frequency of 309.4405994 kHz. To make such a transfer, modulator 28 has an amplitude versus frequency response 46 at the low frequency edge of the spectrum. Response 46 has (1) a zero amplitude in the guard band, i.e., all frequencies that are more than 125 kHz lower than the pilot frequency (indicated by line 44), (2) amplitudes lower than RRC transition 42 for frequencies lower than the pilot frequency, (3) the same amplitude as RRC transition 42 at the pilot frequency and (4) amplitudes above RRC transition 42 for frequencies higher than the pilot until transitions 42 and 46 are completed at a low frequency corner frequency that is removed from the channel edge by two times the pilot frequency, i.e., 618.8811988 kHz. For frequencies removed from the channel edge by more than two times the pilot frequency, i.e., for frequencies greater than the low frequency corner frequency, the amplitude of the response is the same as for mid-band portion 38 of FIG. 2 until the high frequency corner frequency is reached; the high frequency corner frequency is the lowest frequency in transition 40 at the high frequency edge of the spectrum. Transition 46 has an amplitude that exceeds the mid-band amplitude for frequencies that are between the corner frequencies and frequencies displaced from the channel edges by about 360 kHz; a peak amplitude of +1 dB is reached at a frequency about 440 kHz from the channel edge.

Response 46 is attained by applying a weighting function (including linear roll off response 48) to RRC response 42 for frequencies in a range between the pilot frequency (indicated by line 44) and frequencies that are 125 kHz lower than the pilot. After the weighting function is applied, additional operations are performed to attain response 46. The weighting function has a zero value for all frequencies between the channel edge and the frequency that is 125 kHz lower than the pilot. The weighting function of FIG. 3 can be represented by a function G(–f), where –f is the difference between the pilot frequency and every frequency lower than the pilot frequency to the band edge, as $G(-f) = 0$ for $f \geq 125$ kHz, and $$G(-f) = 1 - \frac{f}{125} \text{ kHz for } 0 \leq f < 125 \text{ kHz.} \quad (3)$$

To arrive at response 46 for every frequency of interest that is less than 125 kHz from the pilot frequency, the difference between response 42 and the weighting function for the frequencies of interest between the channel edge and the pilot is determined. This difference is multiplied by the amplitude of RRC response 42 at the frequencies of interest to obtain a resultant product for each frequency of interest. The resultant product for each frequency of interest is divided by the RRC response at the frequencies that are above the pilot frequency by the same amount that the frequencies of interest are below the pilot frequency, to derive resulting quotient for each frequency of interest. The resulting quotient is added to the RRC response at the frequencies of interest that are above the pilot.

Consider the example of (1) a frequency $f_1$ that is lower than the pilot by $f_2$, where $f_2$ is more than 125 kHz, (2) RRC transition response 42 having a value j at $f_1$, and (3) RRC transition response 42 having a value of k at the pilot plus $f_2$. In this example, the product is $j^2$ and the resultant quotient is $$\frac{j^2}{k},$$

whereby $$\frac{j^2}{k}$$

is added to the value k of response 42 at the frequency that is $f_2$ above the pilot to yield $$k + \frac{j^2}{k}$$

for the amplitude of response 46 at $f_2$ above the pilot. Consider a second example of (1) a frequency $f_3$ that is lower than the pilot by $f_4$, where $f_4$ is less than 125 kHz, (2) RRC transition 42 has a value of m at $f_3$, (3) RRC transition 42 has a value of n at the pilot plus $f_4$, and (4) the weighting function has a value p at $f_3$. In the second example, the product is m (m−p), and the quotient of $$\frac{m(m-p)}{n}$$

which is added to n to yield $$\frac{m(m-p)}{n} + n$$

for the amplitude of response 46 at $f_4$ above the pilot. Illustrative values for responses 42 and 46 for frequencies removed from the pilot by the indicated amounts are given in Table I.

TABLE I

| Frequency removed from the pilot (kHz) | RRC response 42 | Response 46 |
| --- | --- | --- |
| −300 | 0.023959 | 0 |
| −200 | 0.2742153 | 0 |
| −100 | 0.5069010 | .1013802 |
| −50 | 0.6119249 | .3671549 |
| −25 | .6608458 | .5286766 |
| +25 | .7505217 | .8668987 |
| +50 | .7909159 | .9802923 |
| +100 | .8620043 | 1.1004705 |
| +200 | .9616683 | 1.0398595 |
| +300 | .9997129 | 1.0002871 |

It is to be understood that other G(f) functions can be used, as long as the G(f) that is employed reduces the bandwidth of the transmitted spectrum sufficiently to prevent interference with transmission from neighboring spectra. The G(f) function must be such that for any voltage at a particular frequency that is removed from the portion of response 42 that is lower than the pilot frequency (i.e., the lower sideband), there is a voltage that is added to a corresponding frequency in the portion of response 42 that is above the pilot frequency. These removed and added voltages are seen by an I channel demodulator of a DTV receiver in the same manner as a transmitted signal conforming with the RRC response curve. Hence, the receiver performance and configuration are unchanged, while achieving a reduction of transmitter bandwidth. In the particular example of FIG. 3, the bandwidth reduction of transition 46 compared to transition 42 is 184 kHz, a sufficient amount to overcome the previously discussed interference problems of the prior art.

The operations described in connection with FIG. 3 can be expressed mathematically as follows:

The RRC response for frequencies less than the pilot (the lower sideband, i.e., LSB) of the receiver to the lower sideband is:

$$Rrc(-f) \qquad (4)$$

The reduced bandwidth amplitude of the LSB is:

$$Rrc(-f)*G(-f) \qquad (5)$$

The amount of "lost voltage" in the LSB is the difference between expressions (4) and (5), i.e.:

$$Rrc(-f)Rrc(-f)*G(-f)=Rrc(-f)*[1-G(-f)] \qquad (6)$$

Applying the LSB RRC response of the receiver to Equation (6) gives:

$$Rrc(-f)-Rrc^2(-f)*G(-f)=Rrc^2(-f)*[1-G(-f)] \qquad (7)$$

Dividing Equation (7) by the RRC response of the receiver for frequencies above the pilot (the upper sideband (USB)) gives:

$$[Rrc(-f)-Rrc^2(-f)*G(-f)]Rrc=Rrc^2(-f)*[1-G(-f)]/Rrc(f) \qquad (8)$$

The frequency response of the receiver upper sideband becomes:

$$Rrc(-f)+Rrc^2(-f)*[1G(-f)]/Rrc(-f) \qquad (9)$$

Concepts similar to those described for transition 42 at the low frequency edge of the baseband spectrum of FIG. 3 are applicable to transition 40 at the high frequency edge of the spectrum. The ATSC standard 8VSB signal pilot that inserter 24 derives includes essential signal components in the baseband modulating spectrum of FIG. 2 that go all the way to the Nyquist rate. When pilot inserter 24 forms the 8VSB signal, the spectrum (FIG. 2) is flat to 5.071678332 ... MHz above the 309.4405594 kHz pilot. At that frequency, root raised cosine upper edge band transition 40 begins to roll off the spectrum. At half the symbol rate above the pilot frequency (i.e., 5.381118881 ... MHz) transition 40 is down 3 dB from the mid-band amplitude indicated by response portion 38. Between this frequency and the channel edge (5.690559441 ... MHz above pilot) the ideal response transitions from −3 dB to zero amplitude. Because baseband energy that pilot inserter 24 derives goes all the way to the Nyquist rate, the frequency components in the RRC transition 40 for frequencies just below the Nyquist rate (half the symbol rate or 5.381118881 ... MHz above pilot, i.e., 5.690559441 .... MHz) are mirror images of the spectrum for frequencies just above the Nyquist rate. The amplitudes of the mirrored spectra are not the same, but the frequencies are mirrored.

When a receiver responsive to the transmitted 8VSB signal demodulates the signal to symbols sampled at the symbol rate, frequency components within transition region 40 just above the Nyquist frequency alias to frequencies just below the Nyquist frequency. This aliasing at the receiver demodulation is intentional and necessary for the system to work properly.

As was the case in the transition region around the pilot at the low frequency edge of the spectrum, the spectral shape in the transition range at the upper channel edge is modified according to FIG. 4 without affecting the demodulated symbols. Modulator 28 removes energy from the spectrum above the Nyquist rate, and replaces it at the equivalent frequency below the Nyquist rate. This spectral modification considers the shape of the receiver RRC filter.

To make the spectral modification to the upper band edge, the 8VSB Nyquist rate (half the symbol rate plus the pilot frequency) of FIG. 4 replaces the pilot frequency of FIG. 3. References to the lower sideband in the discussion of FIG. 3 are interchanged with references to the upper sideband in the discussion of FIG. 4. In other words, in FIG. 4 energy from the frequency range between the Nyquist rate (5.381118881 . . . MHz plus pilot (5.6904559441 MHz)) and the upper channel edge is removed. Modulator 28 compensates for the loss of energy by increasing the signal amplitude between pilot plus 5.071678322 . . . MHz and pilot plus 5.381118881 . . . MHz.

In the amplitude versus frequency response curves at the upper edge of the spectrum as illustrated in FIG. 4, RRC transition 40 is replaced by a reduced bandwidth transition 50 that is derived with the help of a weighting function including linear rolloff 52 from the Nyquist frequency of 5.690559441 MHz (indicated by line 54) to a frequency 125 kHz above the Nyquist frequency. The weighting function has a zero amplitude from the frequency 125 kHz above the Nyquist frequency to the upper edge of the spectrum, at 5.690559441 MHz above the 309.44056 kHz pilot. Hence, modulator 28 removes voltage from frequencies above the Nyquist frequency, and replaces it at the same frequency below the Nyquist frequency, such that the frequency-transposed energy is the same at the receiver demodulator responsive to the receiver RRC filter. Such action does not change the receiver demodulated I channel signal after it is sampled. This is because the signal components at a frequency, f, displaced above the Nyquist frequency produce the same result as sampling a frequency component, f, that is below the Nyquist frequency.

FIG. 4, essentially a mirror image of the lower sideband response of FIG. 3, shows the detail of how modulator 38 forms the narrowband 8VSB spectrum at the upper channel edge. The weighting function has a value of unity for frequencies below the Nyquist frequency plus the pilot frequency, indicated by line 54. For frequencies inserter 24 derives that are between the Nyquist frequency plus the pilot frequency and 125 kHz above the sum of the pilot and Nyquist frequencies, the weighting function straight line 52 goes from 1.0 to zero. In the remaining range, from 125 kHz above the sum of the pilot and Nyquist frequencies to the upper channel edge, the weighting function has a value of zero. The removed lower sideband energy is multiplied by the RRC response. Then it is frequency inverted above the sum of the pilot and Nyquist frequencies, and divided by the RRC response, and finally added to the RRC response. The result is the reduced band response 50 shown in FIG. 4. The shaping of FIG. 4 results in 184 kHz being removed from the upper sideband. The demodulated I channel of this signal that the receiver derives is identical to the demodulated I channel signal that the receiver derives in response to the standard RRC 8VSB spectrum of FIG. 2.

While the foregoing descriptions of FIGS. 3 and 4 describe a method of producing filter shapes which a DTV receiver having a standard 11.5% excess bandwidth that demodulates correctly, there is no requirement to use any particular filter design method. There are many well-known filter design algorithms which can be used to produce filters to perform the method. A suitable design method is to use the Parks-McClellan filter design procedure, which, in turn, uses the Remez algorithm.

These methods can be applied to only the lower band edge, or only the upper band edge, or to both band edges simultaneously, depending on the purpose for reducing the bandwidth of the 8VSB or other appropriate signal. For example, if the problem is producing an (N+1) combiner system, it may only be necessary to reduce the bandwidth at the lower band edge. Or, if an FM station at 88.1 MHz suffers interference from a new DTV allocation at channel 6, only the upper band edge of the 8VSB signal need be reduced. With the previously described particular G(f) function, there is enough energy removed from the channel edges to make the in-band response at the peaks of responses 46 and 50 in FIGS. 3 and 4 rise by approximately 1 dB.

To provide maximum bandwidth reduction on just one channel edge, the bandwidths on both sides of the spectrum can be reduced. In such a case, the resulting spectrum is frequency shifted to one side or the other by the amount of the bandwidth reduction on one side. In these examples, with 184 kHz removed from each side, and with the resulting spectrum shifted by 184 kHz, a total guard band of 368 kHz is created on one side of the spectrum.

Figure 5:
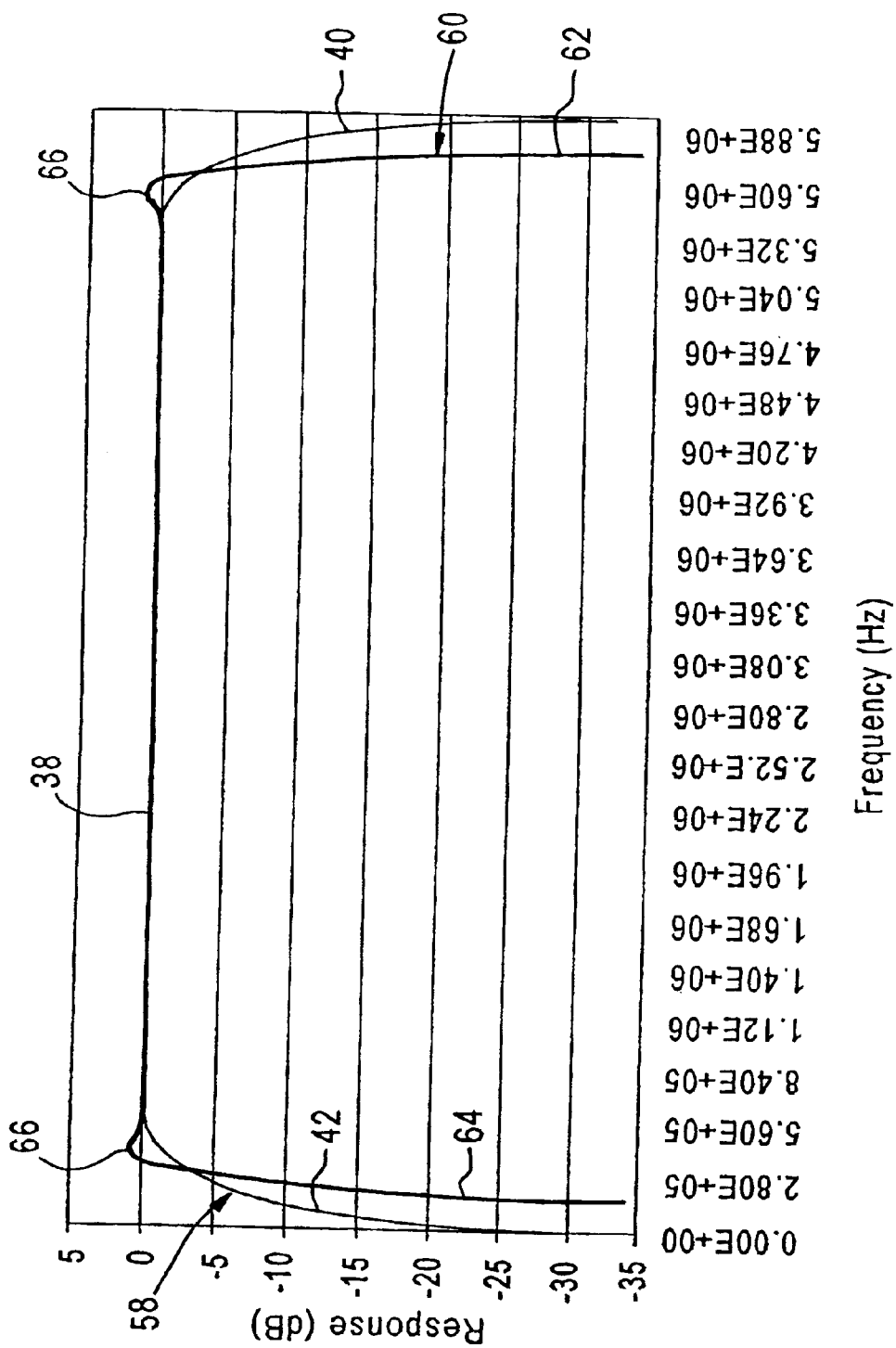
FIG. 5 includes plots, in dB versus frequency, of the response of receivers and prior art transmitters including root raised cosine transitions and an amplitude versus frequency response of a transmitter including the present invention.

FIG. 5 includes amplitude (in dB) versus frequency responses of the prior art spectrum 58 and the spectrum 60 resulting from the present invention. The prior art spectrum 58 includes RRC, monotonic transitions 40 and 42 at the upper and lower edges of the bandpass region. Transitions 40 and 42 conform with the RRC requirement and have amplitudes of −35 dB at the edges of the spectrum and a 0 dB value at the corner frequencies that begin at the mid-range of spectrum 58; the corner frequencies are approximately 600 kHz from each edge of spectrum 58. Spectrum 58 has a 0 dB value throughout its mid-range.

Response 60 includes transitions 62 and 64 at the lower and upper edges of its spectrum. At −35 dB, each of transitions 62 and 64 is displaced toward the mid-portion of response 60 by approximately 184 kHz from the frequencies of transitions 42 and 40. Each of transitions 62 and 64 includes a peak 66 at about +1 dB, i.e., 1 dB above the 0 dB the mid-range amplitude 38 of responses 58 and 60. After having passed through peak points 66, each of transitions 62 and 64 returns to the 0 dB level at a corner frequency where the 0 dB mid-range amplitude of response 60 begins. As described previously in connection with FIGS. 3 and 4, the energy in transitions 62 and 64 at those portions of transitions 62 and 64 above transitions 40 and 42 is due to the energy removed from spectrum 60 that is below the energy in transitions 40 and 42.

From a theoretical conceptual standpoint, a bandpass filter having the response curve 60 of FIG. 5 is the easiest way to attain the spectrum of desired reduced bandwidth response 60. FIG. 6 is a block diagram of a vestigial modulator including bandpass filter 74 having amplitude versus frequency response curve 60.

The vestigial modulator illustrated in FIG. 6 includes simple digital multiplier 70 having a first input responsive to the digital sequence that filter 26 derives and a second input responsive to a digital signal representing a 45 MHz cosine wave that IF carrier frequency generator 72 derives. Simple multiplier 70 responds to the pair of bits supplied to it so that for each +1 symbol at the second input, the multiplier output is the same as the symbol at the first input; for each −1 symbol at the second input the multiplier output is inverted in polarity from the first input; for each zero symbol at the second input the multiplier output is zero. Generator 72 generates each cycle of the cosine sequence supplied to multiplier 140 as a digital, tri-level sequence 1, 0, −1, 0, or a bi-level digital sequence 1, 1, 1, −1. Thus generator 72 produces four binary symbols for each cycle of the IF carrier frequency, which has a frequency of 45 MHz. Thus, IF carrier frequency generator 72 derives bi- or tri-level symbols at a 180 MHz symbol rate. Multiplier 70 is effectively a mixer that derives equal upper and lower sidebands centered on the IF cosine wave that generator 72 derives. Filter 74 shapes the double sideband output of multiplier 70 to provide vestigial sideband spectrum 60. Spectrum 60, at the output of modulator 28, is up converted and inverted by up converter 32, after being converted into an analog signal by analog to digital converter 30.

While the bandpass arrangement of FIG. 6 is conceptually the simplest, it has numerous disadvantages. Vestigial bandpass filter 74 requires a higher symbol calculation rate than the prior art Hilbert or Weaver vestigial sideband modulators. Bandpass filter 74 requires more filter taps than the Hilbert and Weaver approaches, as well as a higher sampling rate than the Weaver and Hilbert approaches which operate as baseband filters, i.e., between 0 and 6 MHz. Hence, from a practical standpoint, the bandpass filter arrangement of filter 76 would not usually be adopted in an actual digital television transmitter.

Reference is now made to FIG. 7 of the drawing, a block diagram of a modified Weaver modulator for deriving a vestigial sideband digital IF signal having reduced bandwidth response 60, FIG. 5. The structure illustrated in FIG. 7 is one preferred embodiment of vestigial modulator 28, FIG. 1.

A multi-bit parallel digital input signal having 12 bits and a sampling frequency of 10.76223776 . . . MHz, as derived from pilot inserter 24 and pre-equalizer filter 26, in the form of an ATSC/A53 television standard, is applied in parallel to identical simple digital multipliers 140 and 142, of the type described supra in connection with multiplier 72, FIG. 6. Multipliers 140 and 142 are responsive to orthogonal digital representations of cosine and sine waves each having a 10.76223776 . . . MHz bit frequency, as derived from folding frequency generator 144, which derives sequences similar to the sequence that generator 72, FIG. 5, derives. Thus, the frequency of each cycle of the cosine sequence supplied by generator 144 to multiplier 140 is 2.690559441 . . . MHz. The sine sequence that generator 144 supplies to multiplier 142 is displaced by one bit, i.e., 90°, from the cosine sequence. A bi-level cosine sequence would be 1, 1, −1, −1, with the corresponding sine sequence being −1, 1, 1, −1. A tri-level cosine sequence would be 1, 0, −1, 0 with the corresponding tri-level sine sequence being 0, 1, 0, −1.

For clarity to describe and illustrate the invention, the levels derived by generator 144 are shown as being simultaneously supplied to multipliers 140 and 142 in the illustrated embodiment. It is to be understood, however, that the cosine and sine sequences can be interleaved, in which case only a single simple multiplier is necessary; in such a case the inputs and outputs of multipliers 140 and 142 are delayed from each other by one-half the period of the 10.76223776 . . . MHz symbol rate.

The product signal multipliers 140 and 142 derive are respectively applied to identical finite impulse response (FIR) digital lowpass filters 146 and 148. Each of filters 146 and 148 can be implemented with approximately 256finite impulse response coefficients, selected to produce the reduced bandwidth response 60, including transitions 62 and 64. Hence, filters 146 and 148 pass, without substantial attenuation, the frequency of the sine and cosine representing waves derived by generator 144 and block virtually all components at the high frequency end of the digital television signal supplied to multipliers 140 and 142. The response curves for filters 146 and 148 are described infra in connection with FIG. 8. Filters 146 and 148 can be replaced by a single filter that is multiplexed to respond to the two product signals multipliers 140 and 142 derive.

Frequency offset circuitry 169, described in detail infra, changes the 21.52447552 MHz output of filters 146 and 148, to a precise round, i.e., decimal, frequency, preferably 21.5 MHz. Frequency offset circuitry 169 supplies to interpolator sets 150 and 152 I and Q channel lowpass filtered sequences that are frequency offset replicas of the sequences digital filters 146 and 148 derive. Interpolator sets 150 and 152 multiply by eight the sampling rate of filters 146 and 148. To this end, interpolator set 150 includes three cascaded times two up sampling interpolators 154–156, and interpolator set 152 includes three cascaded times two up sampling interpolators 158–160. Consequently, the sampling frequency of the output signals of each of interpolators 156 and 160 is 86.0 MHz.

The output signals of interpolators 156 and 160 are respectively supplied to identical digital multipliers 162 and 164, preferably constructed the same as multipliers 70, 140 and 142. Multipliers 162 and 164 are respectively responsive to cosine and sine sequences digital IF generator 166 derives. Each cycle that generator 166 derives has the same values as the cosine and sine sequences derived from folding frequency generator 144; each cycle of the sine and cosine sequences supplied to multipliers 162 and 164 has an IF of 21.5 MHz. Because there are four symbol values in each cycle of the cosine and sine representing sequences that generator 166 derives, the 86.0 MHz symbol frequencies that generator 166 derives are the same as the symbol frequencies that interpolators 156 and 160 derive.

The digital output signals of multipliers 162 and 164 are linearly combined, i.e., summed, in digital adder 168 to produce a digital vestigial sideband IF signal having amplitude versus frequency response 60, FIG. 5; the output of adder is centered at 21.5 MHz.

The output signal of adder 168 is applied to digital to analog converter 30 (FIG. 1), which derives an analog IF vestigial sideband signal including I and Q channels such that the I channel, at predetermined times, contains one of eight levels. The eight levels are commensurate with the binary value of the signal multiplexer 18 derives at a time corresponding to each sampling time. The Q channel of digital to analog converter 30 causes part of the unwanted vestigial sideband that modulator 28 derives to be reduced to a zero amplitude.

Frequency offset circuitry 169 includes digital frequency synthesizer 170 (which functions as an offset frequency generator), general purpose digital mutipliers 172, 174, 176 and 178, and digital adders (i.e., linear combiners) 180 and 182 for respectively adding and subtracting the input signals supplied to them. General purpose multipliers actually multiply the magnitudes of the binary signals supplied to them. Adders 180 and 182 respectively drive interpolators 154 and 158. Multipliers 172 and 178 are driven in parallel by the output signal of lowpass filter 146 while multipliers 174 and 176 are driven in parallel by the output signal of lowpass filter 148. Offset frequency generator 170 derives orthogonal cosine and sine sequences, each cycle of which has digital values that are the same as each cycle of the sequences that folding frequency generator 144 derives.

The cosine output of offset frequency generator 170 is applied in parallel to multipliers 172 and 176, while the sine output of the offset frequency generator is applied in parallel to multipliers 174 and 178. To enable the signal that adder 168 derives to be at an integer value, such as 21.5 MHz, the frequency of generator 170 is set to a value equal to the difference between the desired offset and one-fourth of the bit frequency of the IF output signal; in the specific example, the frequency of offset generator 170 is 24.4755244 . . . kHz.

The digital vestigial sideband modulator of FIG. 7 functions such that the digital output signals of lowpass filters 146 and 148 are respectively represented by $0.5 \sin(\omega_m-\omega_4)t$ and $0.5 \cos(\omega_m-\omega_4)t$. The signals multipliers 172, 174, 176 and 178 derive are respectively represented by:

$$0.5 \cos(\omega_m-\omega_4)t * cos\ \omega_0 t$$

$$0.5 \sin(\omega_m-\omega_4)t * sin\ \omega_0 t$$

$$0.5 \sin(\omega_m-\omega_4)t * cos\ \omega_0$$

$$0.5 \cos(\omega_m-\omega_4)t * sin\ \omega_0 t$$

where $\omega_0$ is the frequency of the television signal derived by pilot inserter 24, ($\omega_4$ is the frequency of generator 144, and $\omega_0$ is the frequency offset generator 170 derives.

Adder 180 sums the output signals of multipliers 172 and 174 to derive a signal which can be shown, by trigonometric manipulation, to equal $$0.5 \sin(\omega_m-\omega_4+\omega_0)t$$

Thus, the output signal of adder 180 is frequency shifted upwardly from the output of lowpass filter 146 by $\omega_0$, the offset frequency of generator 170. Adder 182 subtracts the output signal of multiplier 178 from the output signal of multiplier 176 to derive a signal which can be shown by trigonometric manipulation, to equal $$0.5 \cos(\omega_m-\omega_4+\omega_0)t$$

Thus, the output signal resulting from the subtracting operation of adder 182 is offset in frequency upwardly from the output signal of lowpass filter 148 by $\omega_0$. The output signals of linear combiners 180 and 182 thus have the same frequency but are phase displaced from each other by 90°. Proper manipulation of the polarities at the inputs of adders 180 and 182 or at frequency generator 170 can reverse the direction of the frequency offset.

It is desirable for the output frequencies of linear combiners 180 and 182 to be a precise numerical value to simplify the frequency synthesizer included in up converter 32 which shifts the IF digital to analog converter 30 derives to the carrier frequency power amplifier 36 derives, without affecting the modulation on the carrier digital to analog converter 30 derives.

Up converter 32 is simplified because digital television signals derived in accordance with the ATSC standard can be offset from the carrier frequency by several predetermined frequencies for various reasons, such as the possibility of interference between signals emitted from antennae that might be spaced from each other by 200 or more kilometers but which are at nominally the same frequency, i.e., have the same television channel number. These "channel offsets" can be programmed into the offsetter of FIG. 7.

Because multipliers 172–178 respond to the output signals of lowpass filters 146 and 148 which are at the symbol frequency of 10.76223776 MHz, multipliers 172–178, which perform simple functions such as passing, blocking or inverting the values supplied to them, can be replaced by a single multiplier that is time multiplexed.

The modulator of FIG. 7 enables the digital IF center frequency to be offset so it has a round number without using high speed general purpose digital multipliers at the high frequency sampling rate of eight times the symbol frequency. Digital multiplication is performed at the high frequency by using simple digital multipliers 162 and 164. While multipliers 172–178 are of the general purpose type, these multipliers operate at relatively low frequencies in response to the low sampling frequencies derived by filters 146 and 148 and the low frequency outputs of synthesizer 170.

FIG. 8 is a plot of the identical amplitude (in dB) versus frequency responses 181 of FIR lowpass filters 146 and 148, which enable the vestigial sideband modulator of FIG. 7 to provide the amplitude versus frequency response 60, FIG. 5. Response curve 181 is flat, at 0 dB, from DC to a frequency, $f_6$, equal to the greater of $|f_4-f_f|$ and $|f_f+f_5|$, where $f_4$ is the upper edge of the baseband television signal, i.e., 6 MHz, $f_f$ is the folding frequency of generator 144, i.e., one-fourth of the symbol rate of generator 144, and $f_5$ is the lowest frequency of the baseband spectrum, which for a television spectrum is 0. For frequencies greater than $f_6$, response 181 has the same shape as response 60, FIG. 5, for all frequencies higher than the mid-range portion of response 60. Thus, response 181 of each of filters 146 and 148 for all frequencies in excess of $f_6$ is determined in the same way as response 50, FIG. 4.

In a preferred embodiment, lowpass filters 146 and 148 provide responses 181 by employing 256 coefficients. The first 128 of these coefficients are listed in Table II. The remaining 128 coefficients are symmetrical (i.e., the mirror images) with the coefficients of Table II and thus are not repeated.

TABLE II

| | | | |
|---|---|---|---|
| 3.628325E−04 | −6.000522E−04 | −2.366306E−03 | −3.073699E−03 |
| −1.451344E−03 | 6.857925E−04 | 8.411454E−04 | −4.176315E−04 |
| −6.61839E−04 | 2.99519E−04 | 5.384736E−04 | −2.617595E−04 |
| −4.5618E−04 | 2.546355E−04 | 3.961486E−04 | −2.611832E−04 |
| −3.480937E−04 | 2.749343E−04 | 3.063179E−04 | −2.924158E−04 |
| −2.672116E−04 | 3.112784E−04 | 2.280809E−04 | −3.308854E−04 |
| −1.876924E−04 | 3.506789E−04 | 1.449127E−04 | −3.702461E−04 |
| −9.902383E−05 | 3.891541E−04 | 4.980066E−05 | −4.068929E−04 |
| 3.051773E−06 | 4.234508E−04 | −5.91877E−05 | −4.384037E−04 |
| 1.182099E−04 | 4.513138E−04 | −1.794866E−04 | −4.616347E−04 |
| 2.42067E−04 | 4.681326E−04 | −3.056173E−04 | −4.703579E−04 |
| 3.685901E−04 | 4.667144E−04 | −4.301627E−04 | −4.553552E−04 |
| 4.911573E−04 | 4.372383E−04 | −5.488818E−04 | −4.101423E−04 |
| 6.02634E−04 | 3.727492E−04 | −6.516444E−04 | −3.242859E−04 |
| 6.941199E−04 | 2.621333E−04 | −7.319134E−04 | −1.899532E−04 |
| 7.586739E−04 | 1.03193E−04 | −7.745926E−04 | −1.535478E−06 |

TABLE II-continued

| | | | |
|---|---|---|---|
| 7.778655E-04 | -1.149862E-04 | -7.645711E-04 | 2.485024E-04 |
| 7.319169E-04 | -4.00594E-04 | -6.762365E-04 | 5.737777E-04 |
| 5.93837E-04 | -7.712424E-04 | -4.810862E-04 | 9.967176E-04 |
| 3.341716E-04 | -1.25521E-03 | -1.501516E-04 | 1.552136E-03 |
| -7.353534E-05 | -1.893648E-03 | 3.386813E-04 | 2.286433E-03 |
| -6.461303E-04 | -2.737301E-03 | 9.962169E-04 | 3.25365E-03 |
| -1.387882E-03 | -3.842199E-03 | 1.819697E-03 | 4.509306E-03 |
| -2.290122E-03 | -5.261099E-03 | 2.797515E-03 | 6.102438E-03 |
| -3.342954E-03 | -7.040816E-03 | 3.92574E-03 | 8.08091E-03 |
| -4.547874E-03 | -9.220721E-03 | 5.234013E-03 | 1.048834E-02 |
| -5.982622E-03 | -1.188374E-02 | 6.829642E-03 | 1.343403E-02 |
| -7.816085E-03 | -1.517673E-02 | 9.007661E-03 | 1.717647E-02 |
| -1.050352E-02 | -1.954075E-02 | 1.246001E-02 | 2.245214E-02 |
| -1.514291E-02 | -2.624444E-02 | 1.903638E-02 | 3.157824E-02 |
| -2.512952E-02 | -3.993826E-02 | 3.583379E-02 | 5.546171E-02 |
| -5.903999E-02 | -9.553206E-02 | .1446489 | .4556426 |

In certain situations, discussed previously, it is desirable for the reduced bandwidth transmitter of the present invention to include a vestigial sideband modulator 28 having an asymmetrical response. In one embodiment, the asymmetrical response is derived by using the Weaver technique to derive a spectrum having the normal RRC transitions at the upper and lower band edges. The spectrum is then shifted and the technique of the invention is applied to the resulting shifted spectrum to the band edge having the narrower frequency band. For example, if it is desired to reduce the bandwidth of the spectrum only at the high frequency edge of the spectrum, the prior art spectrum with the RRC transitions is shifted to a lower center frequency. The principles of the invention are then applied to the shifted spectrum. The resulting spectrum has an RRC roll-off at its lower edge and a narrow band response, per FIG. 5, at its upper band edge. The asymmetry occurs even though both FIR lowpass filters responsive to the shifted spectrum have the same response per FIG. 8, because of the "negative" frequencies of the Weaver vestigial sideband operations.

Figure 9:
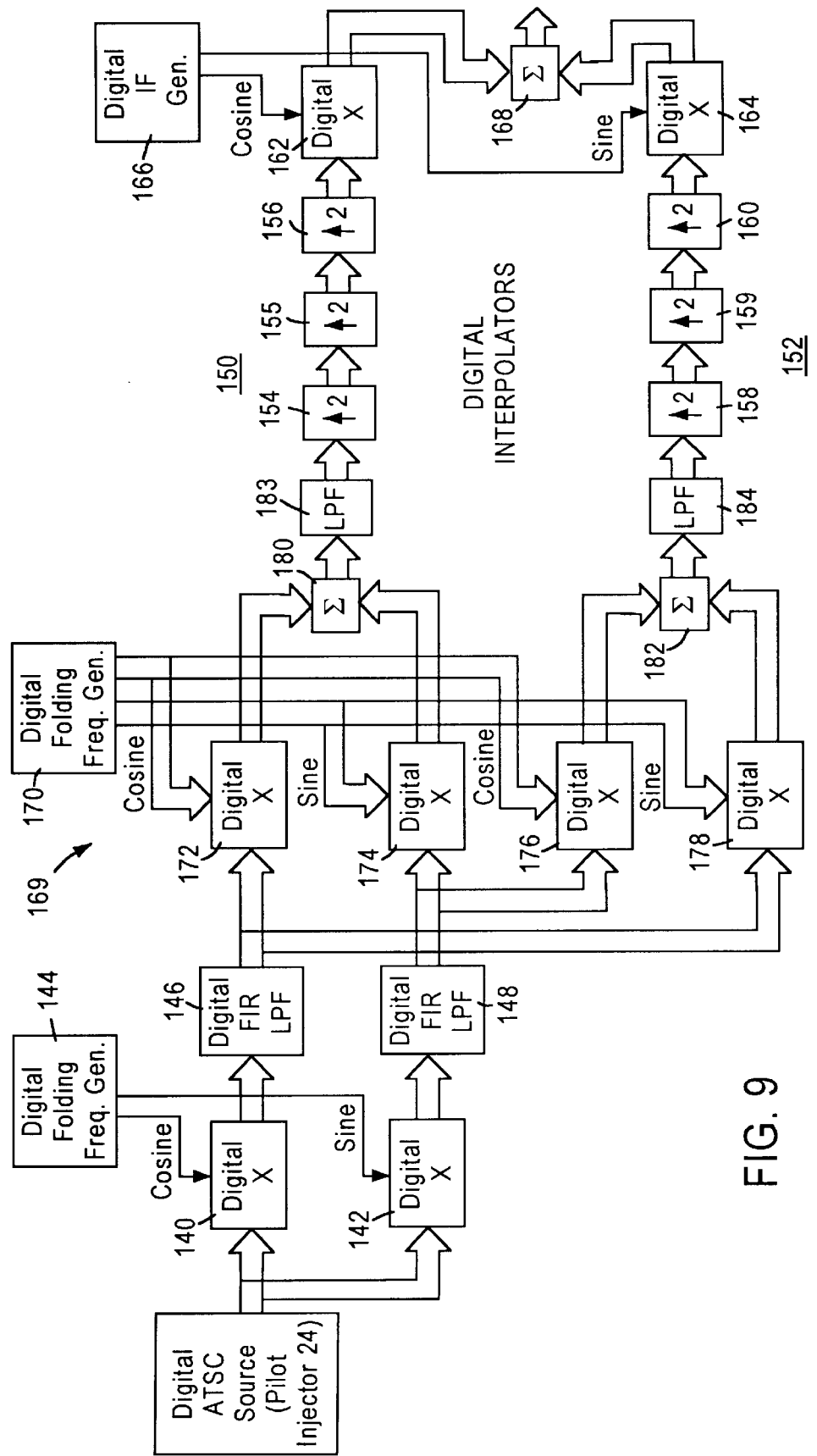
FIG. 9 is a block diagram of a modified Weaver modulator that can be employed as vestigial modulator 28 and which has asymmetrical reduced bandwidth edges on only one of the upper or lower frequency edges of the spectrum.

FIG. 9 is a block diagram of one arrangement for achieving such an asymmetrical spectrum. FIG. 9 is similar to FIG. 7, except that FIG. 9 includes two additional FIR lowpass filters 183 and 184, respectively responsive to summers 180 and 182. The output signals of lowpass filters 183 and 184 are respectively supplied to interpolators 154 and 158. Another difference between FIGS. 7 and 9 is that in the asymmetrical vestigial sideband modulator of FIG. 9, each of lowpass filters 146 and 148 has, at its upper edge, a standard wideband response with RRC transitions beginning at $f_6$, as indicated by monotonic RRC transition 40, FIG. 5, and a flat 0 dB response from DC to the beginning of the monotonic RRC transition. The frequency of offset oscillator 170 is set to provide the desired offset to assist in achieving the asymmetrical frequency response and is not necessarily selected to achieve a precise IF having a rounded numerical value. For asymmetric spectra having reduced energy at the upper channel edge, the frequency and phase relationships of oscillator 170 are set so that frequencies which eventually translate to the upper channel edge are increased to frequencies that will pass through filters 183 and 184, and the frequencies which eventually translate to the lower channel edge are decreased to frequencies that will pass through filters 183 and 184. For asymmetric spectra having reduced energy at the lower channel edge, the direction (sign) of the frequency offset is reversed The frequency responses of lowpass filters 183 and 184 are identical to shape the edge of the spectrum having a reduced bandwidth. To these ends, identical FIR lowpass filters 183 and 184 have the same amplitude versus frequency response curve as illustrated in FIG. 8.

FIG. 10 is a block diagram of a variation of vestigial sideband generator 28, wherein a reduced bandwidth spectrum is provided only at the upper band edge of the spectrum. In the vestigial sideband modulator of FIG. 10, interpolator 190 is connected to respond to the output signal of a pre-equalizer filter 26 to double the sampling frequency of the output of filter 26, i.e., interpolator 190 doubles the symbol rate of the sequence filter 26 derives. FIR lowpass filter 192 responds to the output signal of interpolator 190. Filter 192 has an amplitude versus frequency response, which when multiplied by the standard RRC bandpass response of a DTV receiver results in the upper sideband spectral shape that enables the transmitted spectrum to conform with upper sideband transition 62, FIG. 5. To this end, FIR lowpass filter 192 has the amplitude versus frequency response 181, of FIG. 8.

The output signal of lowpass filter 192 drives multipliers 140 and 142 in parallel. Multipliers 140 and 142 respond to orthogonal sequences generator 144 derives. The resulting product signals at the outputs of multipliers 140 and 142 respectively drive FIR lowpass filters 146 and 148, having standard RRC transitions for all frequencies above $f_6$. Digital folding frequency generator 144 supplies cosine and sine digital sequences having a symbol rate twice the symbol rate that filter 26 derives. Hence, in the embodiment of FIG. 10, FIR lowpass filter 192 derives the reduced bandwidth response 62, while FIR lowpass filters 146 and 148 provide the RRC monotonic response 42, at the low frequency spectrum edge.

Lowpass filters 146 and 148 respectively drive simple multipliers 162 and 164, without the intermediary of interpolator sets 150 and 152 included in the embodiments of FIGS. 7 and 9. Multipliers 162 and 164 also respectively respond to cosine and sine output sequences of digital IF frequency generator 166; generator 166 derives four cosine and four sine symbols per cycle. Multipliers 162 and 164 respond to the inputs thereof to derive product sequences which are added in summer 168, which drives digital to analog converter 30.

Figure 11:
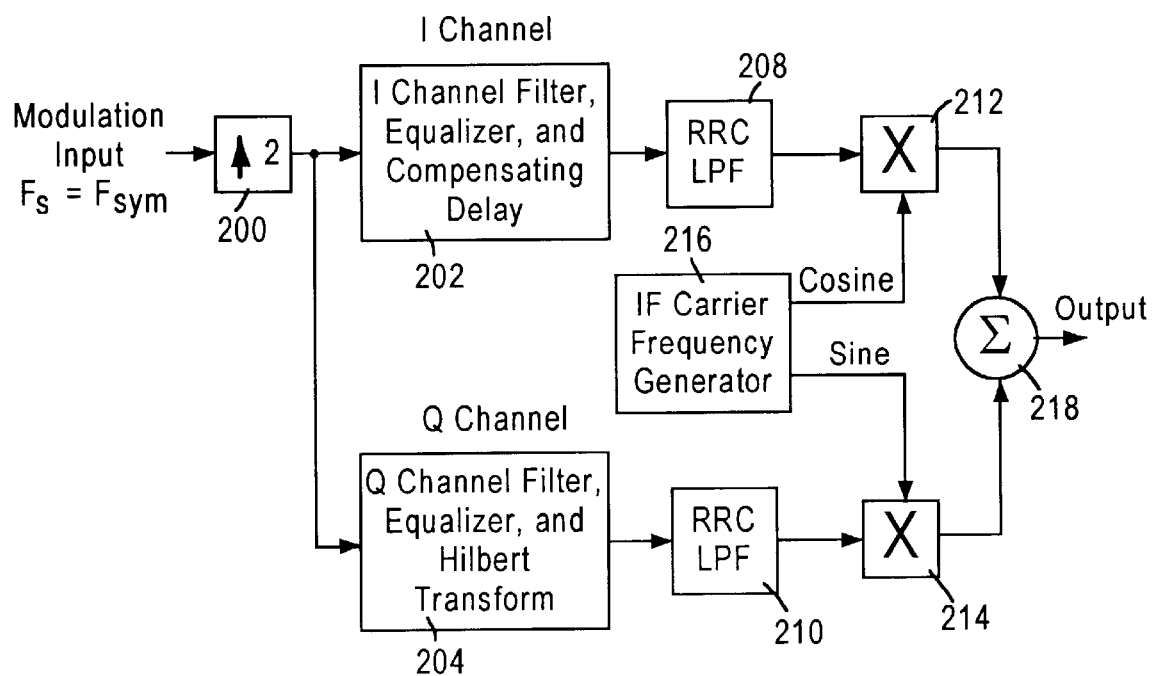
FIG. 11 is a block diagram of a Hilbert transform modulator including the reduced bandwidth responses of FIGS. 3 and 4.

The reduced bandwidth concept of the present invention is also applicable to Hilbert transform devices used as vestigial sideband modulator 28. FIG. 11 is a conceptual block diagram of a Hilbert transform type vestigial sideband modulator employed in the prior art and which can be modified in accordance with the present invention by changing the responses of FIR lowpass filters. The Hilbert transform modulator of FIG. 11 includes interpolator 200 which responds to the output of pilot inserter 24 to increase the sampling frequency of the samples pilot inserter 24 derives by a factor of 2, so that interpolator 200 produces samples at a frequency of 21.52447552 . . . MHz. Increasing the sampling frequency of the output of pilot inserter 24 is necessary because the highest frequency to be transmitted by vestigial sideband modulator 28 is 5.690559441 . . . MHz, i.e., the 6 MHz channel width minus the 309.44006 kHz pilot frequency. The 5.690559441 . . . MHz frequency is slightly higher than the Nyquist frequency for symbol rate processing of 10.76223776 . . . MHz.

The output signal of interpolator 200 drives I channel processor 202 and Q channel processor 204 in parallel. I channel processor 202 includes an I channel filter, pre-equalizer filter 26 and a delay element that compensates for the delay introduced by Q channel processor 204. Q channel processor 204 includes a Q channel filter, pre-equalizer filter 26 and a Hilbert transform which introduces a 90° phase shift for all frequencies interpolator 200 supplies to Q channel processor 204. The amplitude of the I channel filter of I channel processor 200 at any frequency the vestigial modulator derives is proportional to the sum of the voltages the transmitter derives in the upper and lower sidebands at that frequency. The upper and lower sidebands respectively include those frequencies which are greater and less than the pilot frequency. Similarly, the amplitude response of the Q channel filter of Q channel processor 204 at any frequency the vestigial sideband modulator derives is proportional to the upper sideband voltage minus the lower sideband voltage at that frequency.

Interpolator 200 produces a certain amount of aliasing because the spectrum that pilot inserter 24 derives extends from DC to the Nyquist sampling rate with no guard band beyond the Nyquist rate. The aliasing that interpolator 200 introduces is desirable and must appear as a partial inverted replicated spectrum in the spectral tail the transmitter derives at the upper sideband edge. The responses of interpolator 200 and the I channel filter of I channel processor 200 and the Q channel filter of Q channel processor 204 together determine the spectral shape of the spectral tail at the upper channel edge.

Figure 12:
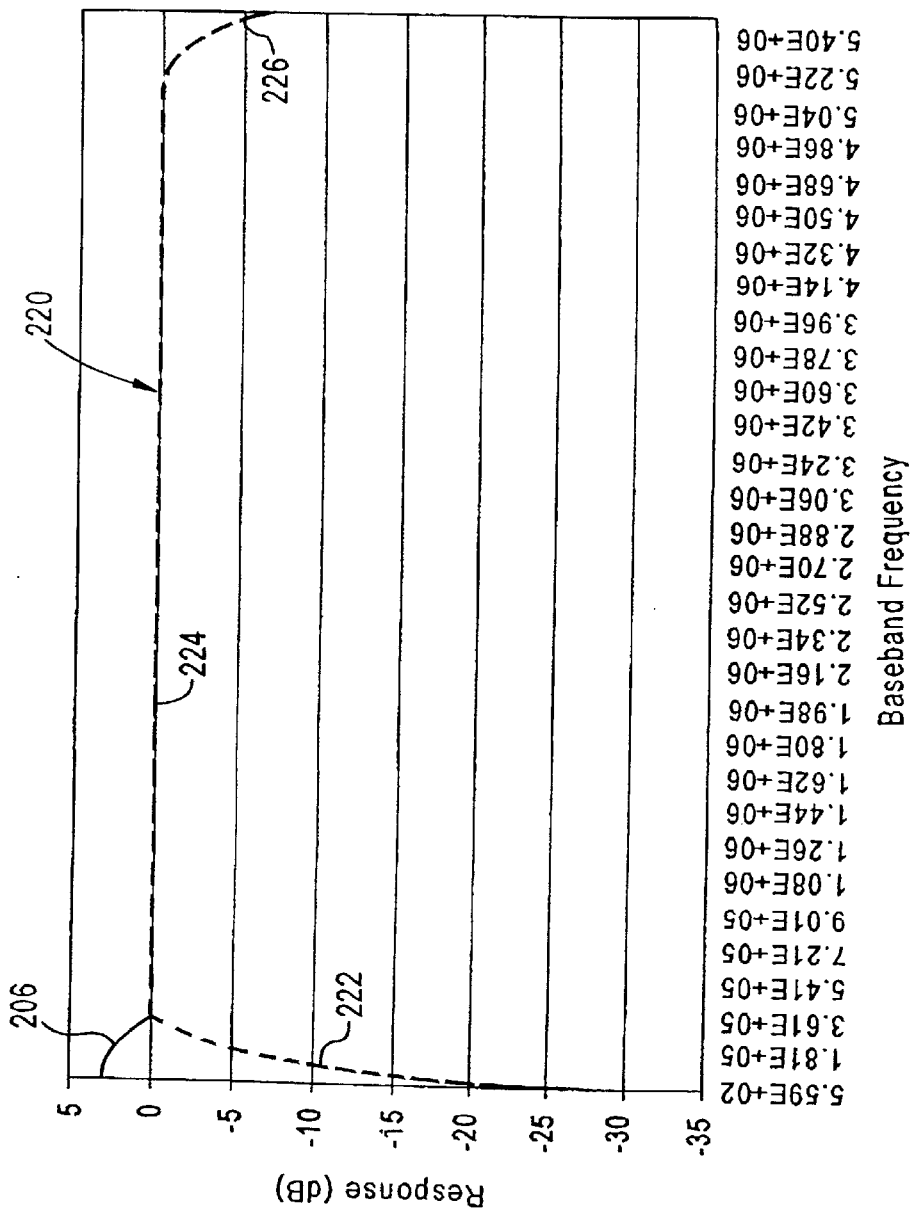
FIG. 12 includes amplitude versus frequency response plots of the I and Q channels of a transmitter including a vestigial sideband Hilbert transform modulator without the reduced bandwidth features of the present invention.

The I channel filter of I channel processor 202 has a linear phase which causes a constant group delay of the signal I channel processor 202 processes, such that the rate of change of phase with respect to frequency is constant. Such a result can be achieved by using a linear phase FIR filter. As indicated by the amplitude (in dB) versus frequency response 206, FIG. 12, the I channel filter of processor 202 includes a +3 dB bump at the low frequency end of the spectrum. The +3 dB bump continues to DC. The +3 dB bump indicated by response 206 represents the difference between the raised cosine response and the root raised cosine response. In the raised cosine response, the pilot frequency is at a frequency that is 6 dB below the 0 dB mid-band response. In the root raised cosine response, the pilot is at a frequency that is down 3 dB from the 0 dB mid-range value. The Q channel filter of Q channel processor 204 has a roll-off that determines the sideband asymmetry, i.e., the level of the vestigial sideband, near the frequency of the pilot carrier.

In the conventional Hilbert transform modulator, the output signals of I and Q channels processors 202 and 204 are respectively supplied to FIR, RRC lowpass filters 208 and 210. Filters 208 and 210 have flat 0 dB responses from DC to the beginning of the monotonic RRC roll-off, i.e., transition. Beyond the roll-off frequency, filters 208 and 210 have the RRC transition.

Interpolator 200, I channel processor 202, Q channel processor 204, and RRC lowpass filters 208 and 210 are, in actuality, consolidated into only two filters. For the I channel, interpolator 200, lowpass filter 208, and I channel processor 202 are combined in a single polyphase filter. The RRC lowpass filter 208, RRC lowpass filter 210, and interpolator 200 permit a certain amount of the inverted replicated spectrum above half the symbol rate to pass. The channel polyphase filter including interpolator 200, processor 202 and lowpass filter 208 includes two sets of interleaved coefficients which alternate two times during each symbol clock pulse of the output of pilot inserter 24. Similarly, interpolator 200, Q channel processor 204 and lowpass filter 210 are, in actuality, combined into a single polyphase filter.

The output signals of lowpass filters 208 and 210 drive one input of simple multipliers 212 and 214, respectively. The remaining input of multiplier 212 responds to a digital cosine sequence that IF carrier frequency generator 216 derives, while the other input of multiplier 214 responds to a sine wave sequence generator 216 derives. Multipliers 212 and 214 derive product signals which are combined in summer 218.

The output signal of summer 218 has the I and Q channel responses 206 and 220 (FIG. 12), respectively. Q channel response 220 includes RRC roll-off transition 222 at the low frequency edge of the spectrum, such that transition 222 has a value of −35 dB at 559 Hz. Response 220 also includes a flat mid-range 0 dB response 224 and asymmetrical roll-off 226 at the upper edge of the spectrum. The I channel response, in addition to including bump 206, has the same mid-channel response 224 and high edge roll-off 226 as the Q channel.

In the low frequency region of response curve 220 (FIG. 12) corresponding to the vestigial sideband portion of the spectrum, the I channel response 206 and the Q channel transition 222 are unequal. As the Q channel amplitude approaches DC, the resulting spectrum that summer 218 derives approaches a double sideband. At the frequencies where the I and Q channel responses are the same, i.e., at all frequencies to the right of the intersection of response 206 and transition 222, the spectrum that summer 218 derives has a single sideband.

To enable the Hilbert transform vestigial modulator to produce a reduced bandwidth spectrum in accordance with the present invention, the I and Q channel frequency responses of vestigial sideband modulator illustrated in FIG. 11 are both modified. For a particular reduced bandwidth spectral shape, the I channel Hilbert response is the sum of the upper and lower sideband shapes, while the Q channel response is the difference between the upper and lower sideband shapes or responses. At low frequencies, near the pilot frequency, the I channel response of the Hilbert vestigial modulator is the same for the present invention as for the RRC prior art modulators. The I channel response of the Hilbert modulator in accordance with the invention is different from the RRC transition only if the upper spectrum edge has a reduced bandwidth. Such a result is achieved by changing FIR lowpass filter 208 from an RRC response to the response of FIG. 8. There is no change to the I channel filter in processor 202 so that the I channel response at low frequencies, in accordance with the present invention, is exactly the same as it is in the prior art RRC response.

The Q channel filter in processor 204 has the same response at its low frequency edge as bandpass filter 74 of FIG. 6, as indicated by transition 64 with peak 66 in FIG. 5, as well as by response 46, FIG. 3. Q channel FIR lowpass filter 210 has frequency response 181, FIG. 8, to achieve the bandwidth reduction at the upper edge of the spectrum.

Figure 13:
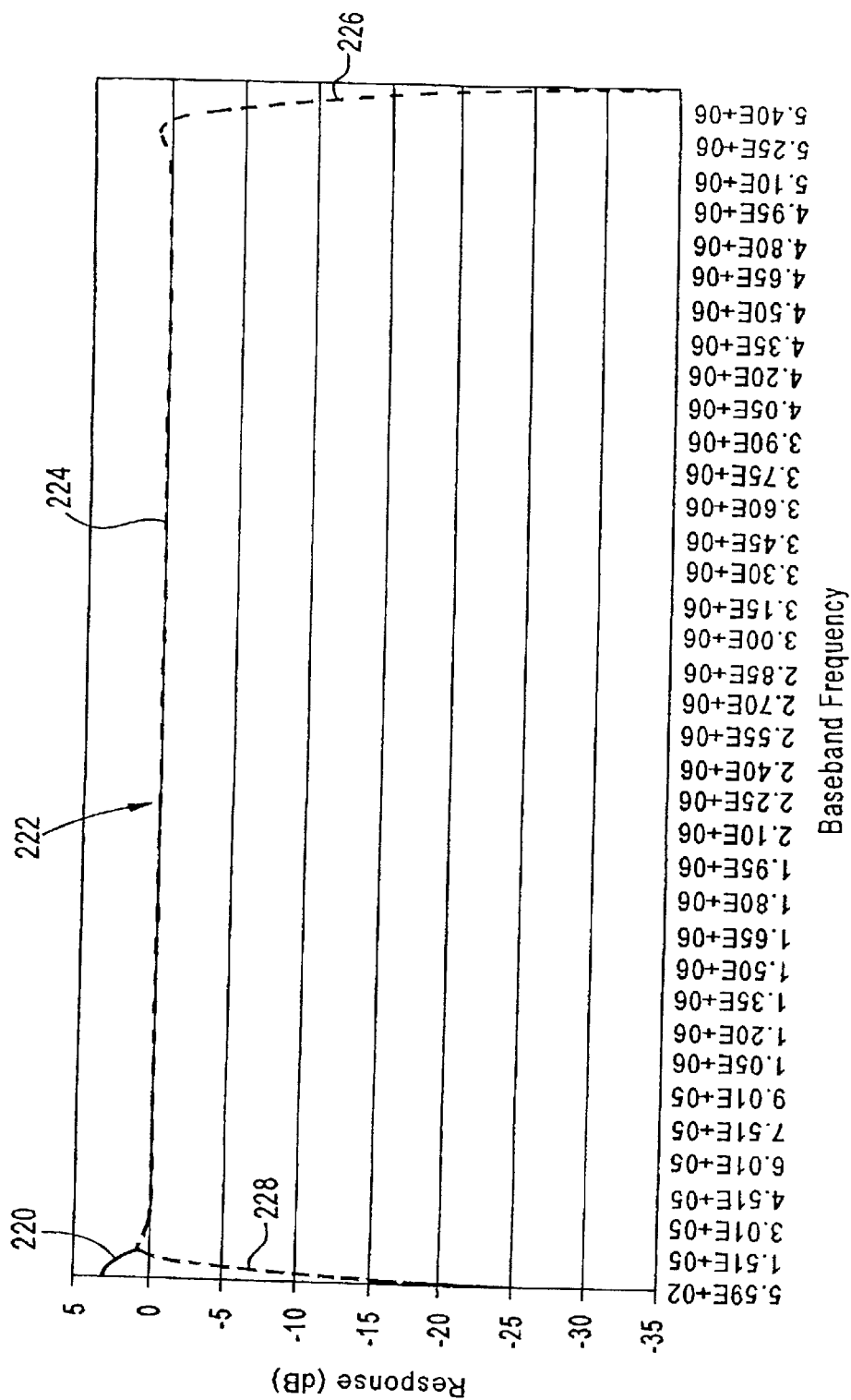
FIG. 13 is a plot of amplitude versus frequency responses of the I and Q channels of a transmitter including the vestigial sideband Hilbert modulator of FIG. 11, i.e., with the reduced bandwidth features of the present invention.

FIG. 13 includes I channel response 220 and the Q channel response 222 of the Hilbert transform modulator of FIG. 11, with modified FIR lowpass filters to achieve the bandwidth reduction of the present invention. The Q channel response 220 includes a 0 dB mid-range portion 224, upper band edge transition 226 and lower band edge transition 228. Transitions 226 and 228 assist in providing the reduced bandwidth and have the same shape as transitions 62 and 64, FIG. 5. Hence, each of transitions 226 and 228 has a peak at 1 dB above 0 dB mid-range response 224. Transition 228 has an amplitude of −35 dB at 559 Hz, while transition 226 has an amplitude at −35 dB at a frequency of 5.69 MHz. The I channel response is the same as the Q channel response for frequencies greater than the frequency where I channel response 220 intersects the peak of transition 228 at +1 dB. Summer 218 combines the I and Q channel responses of FIG. 13. Summer 218 drives digital to analog converter 30 to provide substantially the same response as response 60, FIG. 5.

Figure 1:
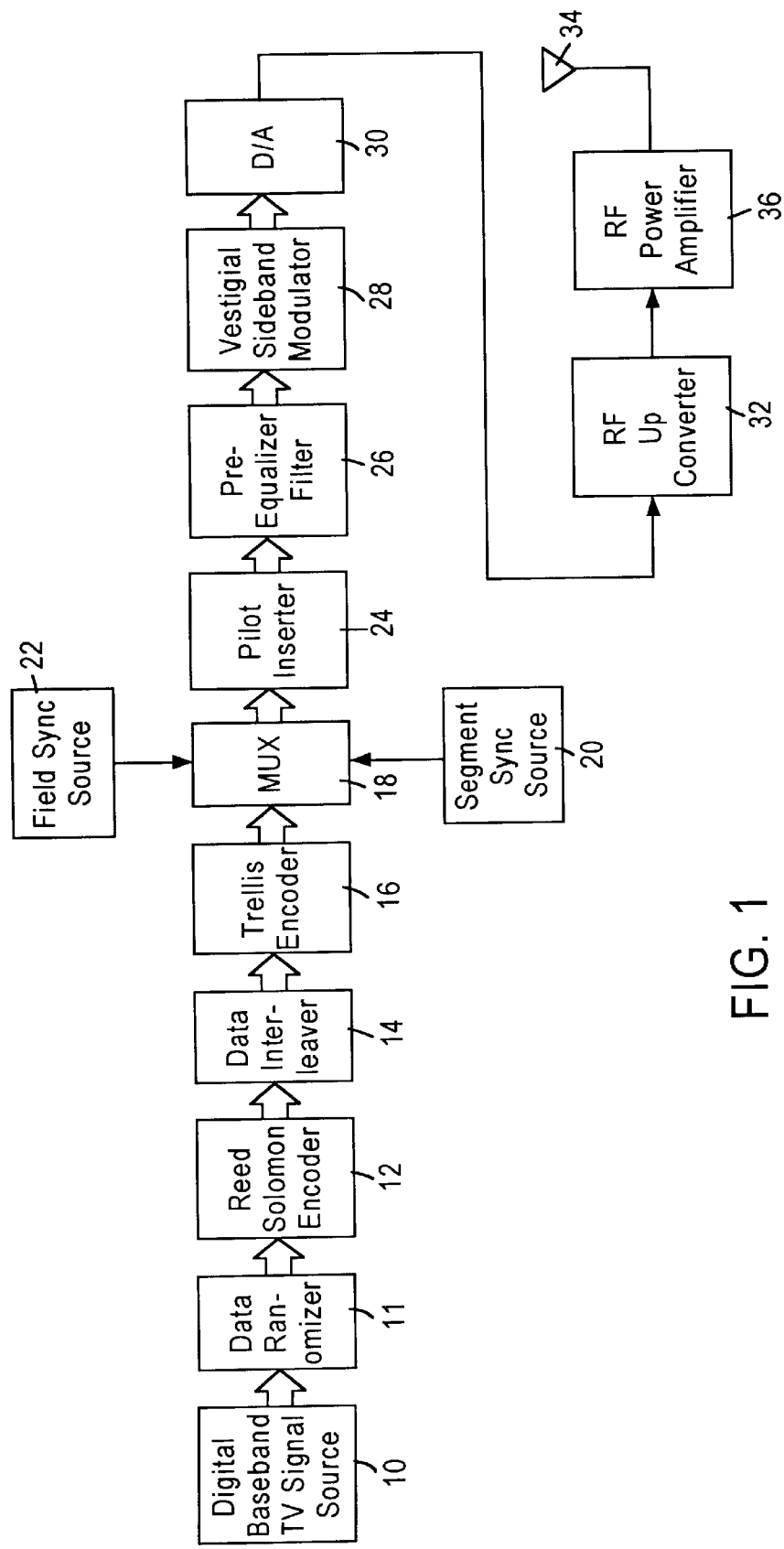
FIGS. 1 and 2 are respectively a block diagram of a prior art DTV transmitter and the baseband amplitude versus frequency response curves of the prior art transmitter.
Figure 14:
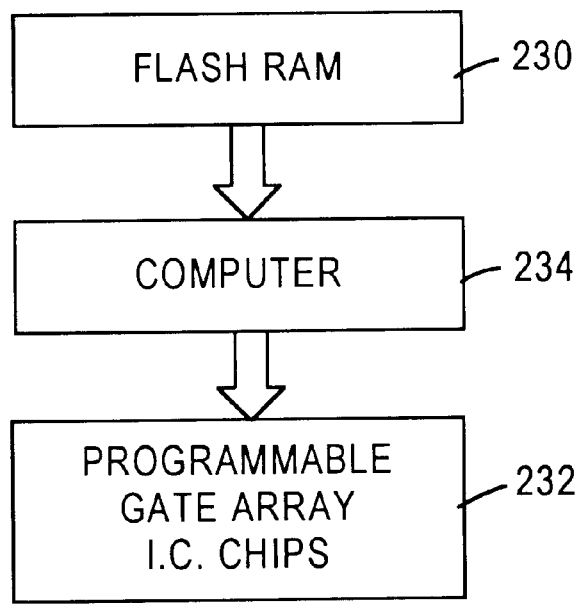
FIG. 14 is a block diagram of a computer based system loading a programmable integrated circuit chip to establish digital circuitry for performing operations associated with a digital television transmitter including the present invention.

The functions of the digital circuitry of FIG. 1, including data randomizer 11, Reed Solomon encoder 12, data interleaver 14, trellis encoder 16, multiplexer 18, segment sync source 20, field sync source 22, pilot inserter 24, pre-equalizer filter 26 and vestigial sideband modulator 28, are stored in flash random access memory 230, FIG. 14. Flash random access memory 230 includes a file that stores the coefficients for the filters, including the coefficients of Table II for the FIR lowpass filters having response 181, FIG. 8. The signals that flash random access memory 230 stores are supplied to computer 234 which controls connections of gates in several field programmable gate array IC chips 232. Computer 234 can be an appropriate personal computer (PC). Each time the transmitter of FIG. 1 is supplied with power, the gates of chips 232 are configured in accordance with the signals stored in flash random access memory 230. The configuration of the gates in chips 232 is changed at will, as are the filter coefficients by changing flash random access memory 230.

While there have been described and illustrated specific embodiments of the invention, it will be clear that variations in the details of the embodiments specifically illustrated and described may be made without departing from the true spirit and scope of the invention as defined in the appended claims.

I claim:

1. A method of preventing substantial interference between portions of first and second spectra that tend to overlap, the overlapping portion of the first spectrum being in a band of frequencies on a first side of a predetermined frequency of the first spectrum, the predetermined frequency being outside the second spectrum and within the first spectrum, comprising the steps of modifying the first spectrum prior to transmission thereof by transferring energy in frequencies on the first side of the predetermined frequency of the first spectrum to frequencies on a second side of the predetermined frequency so that all energy between a first frequency at a band edge of the first spectrum and a second frequency between the first frequency and the predetermined frequency is reduced substantially to zero, the frequencies on the second side being within the first spectrum, the transfer being such that a receiver designed to respond to the first spectrum causes the transferred energy to be shifted from the second side of the predetermined frequency to the first side of the predetermined frequency, and transmitting the modified spectrum, the amount of energy transferred being such that there is no substantial interference between the transmitted first and second spectra.

2. The method of claim 1 wherein the receiver includes a bandpass filter with a transition having a predetermined amplitude versus frequency response between a frequency at one band edge of the bandpass filter and a mid-range portion of the bandpass filter response, the predetermined frequency being displaced from a corner frequency between the mid-range portion and the transition toward the frequency at said one band edge, the energy transfer being such that (1) all energy between said first and second frequencies is transferred on a frequency to frequency basis to frequencies that are on the second side of the predetermined frequency and are equally displaced from the predetermined frequency, and (2) some energy between the second frequency and the predetermined frequency is transferred, on a frequency to frequency basis, to frequencies that are on the second side of the predetermined frequency and are equally displaced from the predetermined frequency, the amount of the energy transferred from between the second frequency and the predetermined frequency being determined by the relative amplitudes of (a) an amplitude versus frequency weighting function that extends over a band of frequencies between the second frequency and the predetermined frequency, and (b) the amplitude versus frequency response of the receiver transition.

3. The method of claim 2 wherein the receiver bandpass filter has a flat mid-range amplitude versus frequency response and a root raised cosine transition between the corner frequency and the first frequency.

4. The method of claim 3 wherein the first spectrum is a DTV vestigial sideband spectrum.

5. The method of claim 4 wherein the predetermined frequency is a baseband pilot carrier frequency.

6. The method of claim 4 wherein the predetermined frequency is a Nyquist sampling frequency.

7. The method of claim 2 wherein the predetermined frequency is approximately half-way between the first and corner frequencies.

8. The method of claim 2 wherein the modified spectrum has a symmetrical amplitude versus frequency response with respect to its center frequency.

9. The method of claim 2 wherein the modified spectrum has an amplitude versus frequency response at its high frequency band edge including the transferred energy and an amplitude versus frequency response at its low frequency band edge that is substantially the same as the receiver transition.

10. The method of claim 2 wherein the modified spectrum has an amplitude versus frequency response at its low frequency band edge including the transferred energy and an amplitude versus frequency response at its high frequency band edge that is substantially the same as the receiver transition.

11. The method of claim 2 wherein the energy transfer is performed by multiplying a baseband signal containing information to be transmitted by sine and cosine representations to derive a pair of product signals, the sine and cosine representations being at a folding frequency, lowpass filtering replicas of the product signals, the lowpass filtering step including multiplying the replicas of the product signals by (a) a constant amplitude from DC to another frequency where the transition begins, (b) amplitudes greater than the constant amplitude for frequencies between the another frequency and a further frequency, (c) finite amplitudes less than the constant amplitude for frequencies greater than the further frequency and (d) zero for frequencies that are displaced from the another frequency by the same amount that said frequency at the band edge of the bandpass filter is displaced from the corner frequency and combining signals resulting from the lowpass filtering steps.

12. The method of claim 11 wherein the replicas on which the lowpass filtering steps are performed result directly from the multiplying operations to cause the spectrum resulting from the combining step to be symmetrical with respect to a frequency at the center of the first spectrum.

13. The method of claim 11 further including shifting the frequency of the spectra of the signals resulting from the lowpass filtering steps to cause the spectrum resulting from the combining step to be symmetrical with respect to a frequency having an exact numerical value.

14. The method of claim 11 further including performing second lowpass filtering steps on replicas of the product signals, the second lowpass filtering steps being performed on the product signal replicas before the lowpass filtering operation defined in claim 11, the second lowpass filtering operations including multiplying the replicas of the product signal by (a) a constant amplitude from DC to the another frequency, and (b) the receiver transition amplitude versus frequency response for frequencies between the another frequency and a frequency removed from the another frequency by an amount equal to the displacement of the band edge of the receiver bandpass filter from the corner frequency, shifting the spectra resulting from the second lowpass filtering steps to cause the spectrum resulting from the combining step to be asymmetrical with respect to a frequency at the center of the first spectrum, the asymmetrical spectrum having the same amplitude versus frequency response at a first band edge as the receiver bandpass filter and to have an amplitude versus frequency response at a second band edge determined by the lowpass filtering operation of claim 11.

15. The method of claim 2 wherein the energy transfer includes lowpass filtering a signal resulting from a baseband signal containing information to be transmitted, the lowpass filtering step including multiplying the signal resulting from the baseband signal by (a) a constant amplitude from DC to another frequency where the transition begins, (b) amplitudes greater than the constant amplitude for frequencies between the another frequency and a further frequency, (c) finite amplitudes less than the constant amplitude for frequencies greater than the further frequency and (d) zero for frequencies that are displaced from the another frequency by the same amount that said frequency at the band edge of the bandpass filter is displaced from the corner frequency.

16. The method of claim 15 further including multiplying the signal resulting from the lowpass filtering step by sine and cosine representations to derive a pair of product signals, the sine and cosine representations being at a folding frequency, performing second lowpass filtering steps on replicas of the product signals, the second lowpass filtering steps being performed on the product signal replicas before the lowpass filtering operation defined in claim 11, the second lowpass filtering operations multiplying the replicas of the product signal by (a) a constant amplitude from DC to the another frequency, and (b) the receiver transition amplitude versus frequency response for frequencies between the another frequency and a frequency removed from the another frequency by an amount equal to the displacement of the band edge of the receiver bandpass filter from the corner frequency.

17. The method of claim 16 further including multiplying the signals resulting from the second lowpass filtering step by cosine and sine representations of an IF to derive second product signals, and combining the second product signals to derive an asymmetrical spectrum that has the amplitude versus frequency response of the receiver transitions at its low frequency edge and the amplitude versus frequency response resulting from the lowpass filter operation of claim 15 at its high frequency edge.

18. The method of claim 15 further including performing I and Q channel Hilbert transform operations on a signal resulting from the baseband signal so that signals resulting from the I and Q channel Hilbert transform operations have the lowpass filtering operations of claim 15 applied to them, and combining replicas of the signals resulting from the I and Q channel Hilbert transform operations to derive the first spectrum.

19. The method of claim 18 wherein the combining step includes multiplying the signals resulting from the I and Q channel Hilbert transform operations with representations of cosine and sine waves at an IF to form product signals, and adding the product signals.

20. The method of claim 1 wherein the first spectrum is a DTV vestigial sideband spectrum and wherein the receiver has a bandpass filter with a flat mid-range amplitude versus frequency response and a root raised cosine transition between a corner frequency and the first frequency, the corner frequency being the frequency where the receiver bandpass filter response changes from the mid-range amplitude to the root raised cosine transition.

21. The method of claim 20 wherein the predetermined frequency is a baseband pilot carrier frequency.

22. The method of claim 20 wherein the predetermined frequency is a Nyquist sampling frequency.

23. The method of claim 20 wherein the modified spectrum has a symmetrical amplitude versus frequency response with respect to its center frequency.

24. The method of claim 20 wherein the modified spectrum has an amplitude versus frequency response at its high frequency band edge including the transferred energy and an amplitude versus frequency response at its low frequency band edge that is substantially the same as the receiver transition.

25. The method of claim 20 wherein the modified spectrum has an amplitude versus frequency response at its low frequency band edge including the transferred energy and an amplitude versus frequency response at its high frequency band edge that is substantially the same as the receiver transition.

26. The method of claim 20 wherein the energy transfer includes lowpass filtering a signal resulting from a baseband DTV signal, the lowpass filtering step including multiplying the signal resulting from the baseband signal by (a) a constant amplitude from DC to another frequency where the transition begins, (b) amplitudes greater than the constant amplitude for frequencies between another frequency and a further frequency, (c) finite amplitudes less than the constant amplitude for frequencies greater than the further frequency and (d) zero for frequencies that are displaced from the another frequency by the same amount that said frequency at the band edge of the bandpass filter is displaced from the corner frequency.

27. The method of claim 26 further including multiplying the signal resulting from the lowpass filtering step by sine and cosine representations to derive a pair of product signals, the sine and cosine representations being at a folding frequency, performing second lowpass filtering steps on replicas of the product signals, the second lowpass filtering steps being performed on the product signal replicas before the lowpass filtering operation defined in claim 26, the second lowpass filtering operations multiplying the replicas of the product signal by (a) a constant amplitude from DC to the another frequency, and (b) the receiver transition amplitude versus frequency response for frequencies between the another frequency and a frequency removed from the another frequency by an amount equal to the displacement of the band edge of the receiver bandpass filter from the corner frequency.

28. The method of claim 27 further including multiplying the signals resulting from the second lowpass filtering step by cosine and sine representations of an IF to derive second product signals, and combining the second product signals to derive an asymmetrical spectrum that has the amplitude versus frequency response of the receiver transitions at its low frequency edge and the amplitude versus frequency response resulting from the lowpass filter operation of claim 26 at its high frequency edge.

29. The method of claim 26 further including performing I and Q channel Hilbert transform operations on a signal resulting from the baseband signal so that signals resulting from the I and Q channel Hilbert transform operations have the lowpass filtering operations of claim 26 applied to them, and combining replicas of the signals resulting from the I and Q channel Hilbert transform operations to derive the first spectrum.

30. The method of claim 29 wherein the combining step includes multiplying the signals resulting from the I and Q channel Hilbert transform operations with representations of cosine and sine waves at an IF to form product signals, and adding the product signals.

31. A transmitter for a first spectrum having a portion that tends to overlap in an interfering manner with a neighboring, second spectrum, the overlapping portion being in a band of frequencies on a first side of a predetermined frequency, the predetermined frequency being outside the second spectrum and within the first spectrum, the transmitter comprising a filter for modifying the first spectrum prior to transmission, the filter being arranged for transferring energy in frequencies on the first side of the predetermined frequency of the first spectrum to frequencies on a second side of the predetermined frequency, the energy transfer causing substantial elimination from the first spectrum of all energy between a band edge of the first spectrum and another frequency between the band edge and the predetermined frequency, the frequencies on the second side being within the first spectrum, the transfer being such that receivers designed to respond to the first spectrum cause the transferred energy to be shifted from the second side of the predetermined frequency to the first side of the predetermined frequency, and an output device connected to be responsive to the modified spectrum.

32. The transmitter of claim 31 wherein the first spectrum is included in a signal source comprising a digital baseband television signal source and a carrier pilot inserted on the digital baseband television signal source, the filter including a digital vestigial sideband modulator connected to be responsive to the digital baseband television signal source and the carrier pilot inserted on the digital -baseband television signal source.

33. The transmitter of claim 32 wherein the digital vestigial sideband modulator includes a digital filter including a Hilbert transform combined with a lowpass filter having an amplitude versus frequency response for causing the energy transfer.

34. The transmitter of claim 32 wherein the vestigial sideband modulator includes a digital folding frequency source for deriving orthogonal components at the predetermined frequency, a digital multiplier arrangement connected to be responsive to the orthogonal components and the digital signal source for deriving a pair of orthogonal product digital signal components, a digital lowpass filter arrangement connected to be responsive to the pair of orthogonal product digital signal components, an arrangement for combining the orthogonal digital signal components passed by the digital lowpass filter arrangement, the digital lowpass filter arrangement having a response and the digital signal components passed by the digital lowpass filter being combined so the energy transfer occurs and there is no substantial energy between the another frequency and the band edge of the first spectrum.

35. A memory for controlling an electromagnetic wave transmitter, the transmitter being arranged for transmitting a signal to a receiver having a predetermined response, the memory storing signals for preventing substantial interference between portions of first and second spectra that tend to overlap, the overlapping portion of the first spectrum being in a band of frequencies on a first side of a predetermined frequency of the first spectrum, the predetermined frequency being outside the second spectrum and within the first spectrum, the stored signals causing a modification of the first spectrum prior to transmission thereof by transferring energy in frequencies on the first side of the predetermined frequency of the first spectrum to frequencies on a second side of the predetermined frequency so that all energy between a first frequency at the band edge and a second frequency between the first frequency and the predetermined frequency is reduced substantially to zero, the frequencies on the second side being within the first spectrum, the transfer being such that a receiver designed to respond to the first spectrum causes the transferred energy to be shifted from the second side of the predetermined frequency to the first side of the predetermined frequency.

36. A transmitter for a first spectrum having a portion that tends to overlap in an interfering manner with a neighboring, second spectrum, the overlapping portion being in a band of frequencies on a first side of a predetermined frequency, the predetermined frequency being outside the second spectrum and within the first spectrum, the transmitter comprising a filter for modifying the first spectrum prior to transmission, the filter being adapted to be arranged for transferring energy in frequencies on the first side of the predetermined frequency of the first spectrum to frequencies on a second side of the predetermined frequency, the energy transfer causing substantial elimination from the first spectrum of all energy between a band edge of the first spectrum and another frequency between the band edge and the predetermined frequency, the frequencies on the second side being within the first spectrum, the transfer being such that receivers designed to respond to the first spectrum cause the transferred energy to be shifted from the second side of the predetermined frequency to the first side of the predetermined frequency, and an output device connected to be responsive to the modified spectrum.

37. The transmitter of claim 36 wherein the first spectrum is included in a signal source comprising a digital baseband television signal source and a carrier pilot inserted on the digital baseband television signal source, the filter including a digital vestigial sideband modulator connected to be responsive to the digital baseband television signal source and the carrier pilot inserted on the digital baseband television signal source.

38. The transmitter of claim 37 wherein the digital vestigial sideband modulator includes a digital filter including a Hilbert transform combined with a lowpass filter having an amplitude versus frequency response for causing the energy transfer.

39. The transmitter of claim 37 wherein the vestigial sideband modulator includes a digital folding frequency source for deriving orthogonal components at the predetermined frequency, a digital multiplier arrangement connected to be responsive to the orthogonal components and the digital signal source for deriving a pair of orthogonal product digital signal components, a digital lowpass filter arrangement connected to be responsive to the pair of orthogonal product digital signal components, an arrangement for combining the orthogonal digital signal components passed by the digital lowpass filter arrangement, the digital lowpass filter arrangement having a response and the digital signal components passed by the digital lowpass filter being combined so the energy transfer occurs and there is no substantial energy between the another frequency and the band edge of the first spectrum.

40. The transmitter of claim 36 wherein the receivers include a bandpass filter with a transition having a predetermined amplitude versus frequency response between a frequency at one band edge of the bandpass filter and a mid-range portion of the bandpass filter response, the predetermined frequency being displaced from a corner frequency between the mid-range portion and the transition toward the frequency at said one band edge, the energy transfer being such that (1) all energy between said first and second frequencies is transferred on a frequency to frequency basis to frequencies that are on the second side of the predetermined frequency and are equally displaced from the predetermined frequency, and (2) some energy between the second frequency and the predetermined frequency is transferred, on a frequency to frequency basis, to frequencies that are on the second side of the predetermined frequency and are equally displaced from the predetermined frequency, the amount of the energy transferred from between the second frequency and the predetermined frequency being determined by the relative amplitudes of (a) an amplitude versus frequency weighting function that extends over a band of frequencies between the second frequency and the predetermined frequency, and (b) the amplitude versus frequency response of the receiver transition.

41. The transmitter of claim 40 wherein the first spectrum is a DTV vestigial sideband spectrum.

42. The transmitter of claim 41 wherein the predetermined frequency is a baseband pilot carrier frequency.

43. The transmitter of claim 41 wherein the predetermined frequency is a Nyquist sampling frequency.

44. The transmitter of claim 40 wherein the predetermined frequency is approximately half-way between the first and corner frequencies.

45. The transmitter of claim 40 wherein the modified spectrum has a symmetrical amplitude versus frequency response with respect to its center frequency.

46. The transmitter of claim 40 wherein the modified spectrum has an amplitude versus frequency response at its high frequency band edge including the transferred energy and an amplitude versus frequency response at its low frequency band edge that is substantially the same as the transition of the receivers.

47. The transmitter of claim 36 wherein the first spectrum is a DTV vestigial sideband spectrum and wherein the receivers have a bandpass filter with a flat mid-range amplitude versus frequency response and a root raised cosine transition between a corner frequency and the first frequency, the corner frequency being the frequency where the receiver bandpass filter response changes from the mid-range amplitude to the root raised cosine transition.

48. The transmitter of claim 47 wherein the predetermined frequency is a baseband pilot carrier frequency.

49. The transmitter of claim 47 wherein the predetermined frequency is a Nyquist sampling frequency.

50. The transmitter of claim 47 wherein the modified spectrum has a symmetrical amplitude versus frequency response with respect to its center frequency.

51. The transmitter of claim 47 wherein the modified spectrum has an amplitude versus frequency response at its high frequency band edge including the transferred energy and an amplitude versus frequency response at its low frequency band edge that is substantially the same as the receiver transition.

52. The transmitter of claim 47 wherein the modified spectrum has an amplitude versus frequency response at its low frequency band edge including the transferred energy and an amplitude versus frequency response at its high frequency band edge that is substantially the same as the receiver transition.

53. A transmitter for a digital television signal including a first spectrum having a portion that tends to overlap in an interfering manner with a neighboring, second spectrum, the overlapping portion being in a band of frequencies on a first side of a predetermined frequency, the predetermined frequency being outside the second spectrum and within the first spectrum, the transmitter comprising a digital signal processing arrangement for modifying the first spectrum prior to transmission, a controller for causing the digital signal processing arrangement to transfer energy in frequencies on the first side of the predetermined frequency of the first spectrum to frequencies on a second side of the predetermined frequency, the energy transfer causing substantial elimination from the first spectrum of all energy between a band edge of the first spectrum and another frequency between the band edge and the predetermined frequency, the frequencies on the second side being within the first spectrum, the transfer being such that receivers designed to respond to the first spectrum cause the transferred energy to be shifted from the second side of the predetermined frequency to the first side of the predetermined frequency, and an output device connected to be responsive to the modified spectrum.

54. The transmitter of claim 53 wherein the digital television signal is a baseband signal and the first spectrum includes a carrier pilot inserted on the digital baseband television signal, the filter including a digital vestigial sideband modulator connected to be responsive to the digital baseband television signal source and the carrier pilot inserted on the digital baseband television signal source.

55. The transmitter of claim 54 wherein the digital vestigial sideband modulator includes a digital filter including a Hilbert transform combined with a lowpass filter having an amplitude versus frequency response for causing the energy transfer.

56. The transmitter of claim 54 wherein the vestigial sideband modulator includes a digital folding frequency source for deriving orthogonal components at the predetermined frequency, a digital multiplier arrangement connected to be responsive to the orthogonal components and the digital signal source for deriving a pair of orthogonal product digital signal components, a digital lowpass filter arrangement connected to be responsive to the pair of orthogonal product digital signal components, an arrangement for combining the orthogonal digital signal components passed by the digital lowpass filter arrangement, the digital lowpass filter arrangement having a response and the digital signal components passed by the digital lowpass filter being combined so the energy transfer occurs and there is no substantial energy between the another frequency and the band edge of the first spectrum.

57. The transmitter of claim 53 wherein the first spectrum is a vestigial sideband spectrum and wherein the receivers have a bandpass filter with a flat mid-range amplitude versus frequency response and a root raised cosine transition between a corner frequency and the first frequency, the corner frequency being the frequency where the receiver bandpass filter response changes from the mid-range amplitude to the root raised cosine transition.

58. The transmitter of claim 57 wherein the predetermined frequency is a baseband pilot carrier frequency.

59. The transmitter of claim 57 wherein the predetermined frequency is a Nyquist sampling frequency.

60. The transmitter of claim 57 wherein the modified spectrum has a symmetrical amplitude versus frequency response with respect to its center frequency.

61. The transmitter of claim 57 wherein the modified spectrum has an amplitude versus frequency response at its high frequency band edge including the transferred energy and an amplitude versus frequency response at its low frequency band edge that is substantially the same as the transition of the receivers.

62. The transmitter of claim 57 wherein the modified spectrum has an amplitude versus frequency response at its low frequency band edge including the transferred energy and an amplitude versus frequency response at its high frequency band edge that is substantially the same as the transition of the receivers.

* * * * *